(12) United States Patent
Clampitt, III et al.

(10) Patent No.: US 11,119,824 B2
(45) Date of Patent: Sep. 14, 2021

(54) TECHNOLOGIES FOR IMPLEMENTING CONSOLIDATED DEVICE INFRASTRUCTURE SYSTEMS

(71) Applicant: Intel Corporation, Santa Clara, CA (US)

(72) Inventors: Charles C. Clampitt, III, Beaverton, OR (US); Katalin K. Bartfai-Walcott, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 257 days.

(21) Appl. No.: 16/303,579

(22) PCT Filed: Jun. 23, 2017

(86) PCT No.: PCT/US2017/039098
§ 371 (c)(1),
(2) Date: Nov. 20, 2018

(87) PCT Pub. No.: WO2018/005297
PCT Pub. Date: Jan. 4, 2018

(65) Prior Publication Data
US 2020/0319925 A1    Oct. 8, 2020

Related U.S. Application Data

(60) Provisional application No. 62/356,790, filed on Jun. 30, 2016.

(51) Int. Cl.
*G06F 9/50* (2006.01)
*G06F 9/445* (2018.01)
(Continued)

(52) U.S. Cl.
CPC ........ *G06F 9/5005* (2013.01); *G06F 9/44505* (2013.01); *G06F 9/45558* (2013.01);
(Continued)

(58) Field of Classification Search
CPC .... G06F 9/5072; G06F 9/505; G06F 9/44505; G06F 9/45558; G06F 11/1441;
(Continued)

(56) References Cited

U.S. PATENT DOCUMENTS

2002/0143966 A1   10/2002   Sibecas et al.
2011/0041066 A1    2/2011   Kimmet
(Continued)

FOREIGN PATENT DOCUMENTS

WO   WO 2012-021330 A2   2/2012

OTHER PUBLICATIONS

International Search Report and Written Opinion dated Sep. 26, 2017 for International Application No. PCT/US2017/039098, 12 pages.

*Primary Examiner* — Jacob D Dascomb
(74) *Attorney, Agent, or Firm* — Schwabe, Williamson & Wyatt, P.C.

(57) ABSTRACT

Apparatuses, methods and storage media associated with a consolidate device infrastructure to provide rapid device service are disclosed herein. In embodiments, a system comprises a portal to provide a presentation tier of services; a business logic layer to provide a logic tier of services; and a plurality of data management servers remotely and separately disposed in a plurality of locations to provide a data tier of services and a hardware tier of services. The presentation tier of services, logic tier of services, the data tier of services, and the hardware tier of services may cooperate to selectively provide a subset of a plurality of resources associated with the data management servers for use, in response to a device resource request received through the portal. Other embodiments may be described and/or claimed.

23 Claims, 15 Drawing Sheets

(51) Int. Cl.
  *G06F 9/455*   (2018.01)
  *G06F 11/14*   (2006.01)
  *H04L 29/12*   (2006.01)
  *G06F 13/38*   (2006.01)

(52) U.S. Cl.
  CPC ............ *G06F 9/505* (2013.01); *G06F 9/5072* (2013.01); *G06F 11/1441* (2013.01); *G06F 13/385* (2013.01); *H04L 61/256* (2013.01); *G06F 2009/4557* (2013.01); *G06F 2009/45562* (2013.01); *G06F 2009/45595* (2013.01)

(58) Field of Classification Search
  CPC ... G06F 2009/45562; G06F 2009/4557; G06F 2009/45595; G06F 13/385; H04L 61/256
  See application file for complete search history.

(56) References Cited

U.S. PATENT DOCUMENTS

| | | |
|---|---|---|
| 2013/0304923 A1 | 11/2013 | Clay et al. |
| 2015/0106498 A1* | 4/2015 | Gulley .................... H04L 67/32 709/223 |
| 2016/0105489 A1* | 4/2016 | Llorca ....................... G06F 9/50 709/226 |
| 2016/0162320 A1 | 6/2016 | Singh et al. |

* cited by examiner

TECHNOLOGIES FOR IMPLEMENTING CONSOLIDATED DEVICE INFRASTRUCTURE SYSTEMS

RELATED APPLICATIONS

The present application is a national phase entry under 35 U.S.C. § 371 of International Application No. PCT/US2017/039098, filed Jun. 22, 2017, entitled "TECHNOLOGIES FOR IMPLEMENTING CONSOLIDATED DEVICE INFRASTRUCTURE SYSTEMS", which designated, among the various States, the United States of America and also claims priority under 35 U.S.C. § 119 to U.S. Provisional Application No. 62/356,790 filed on Jun. 30, 2016, entitled "CONSOLIDATED DEVICE INFRASTRUCTURE (CDI) SYSTEM FOR RAPID IT SERVICE DELIVERY", the contents of each of which are hereby incorporated by reference in their entireties.

TECHNICAL FIELD

The present disclosure relates to the field of computing. More particularly, the present disclosure relates to systems, apparatuses, methods, and computer-readable media associated with consolidated device infrastructure (CDI) systems for rapid service delivery.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Many large enterprise implementations of development projects deal with varying requirements of the developers, the complexities of the code ownership, development, test environments, the maintenance and structure of application promotion from development to test to production and the replication and resolution of code corrections, problems and user issues. Since the needs of the business require that the applications and solutions with a certain level of precision and quality, the information technology (IT) infrastructure is usually overprovisioned in order to maintain the development and test environments for all the current systems in production along with infrastructure which supports backwards compatibility and forward looking development. Furthermore, the duplication of systems and processes may also lead to security problems and violations of corporate policies.

In summary, large companies typically deal with the same or similar core problems: duplication of physical hardware; duplication of supported applications that supply the same service offering; duplication of engineering effort; dedicated project hardware underutilized across multiple projects while other programs are suffering over utilization causing bottlenecks; project dedicated applications that provide like or similar services; non-standard, unenforced, or incomplete business continuity puts customer development programs at high risk; non-standard services and hardware, added with excessive variety; forces split security focuses; and non-standard services and hardware make staffing to support critical services appropriately unreasonable.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
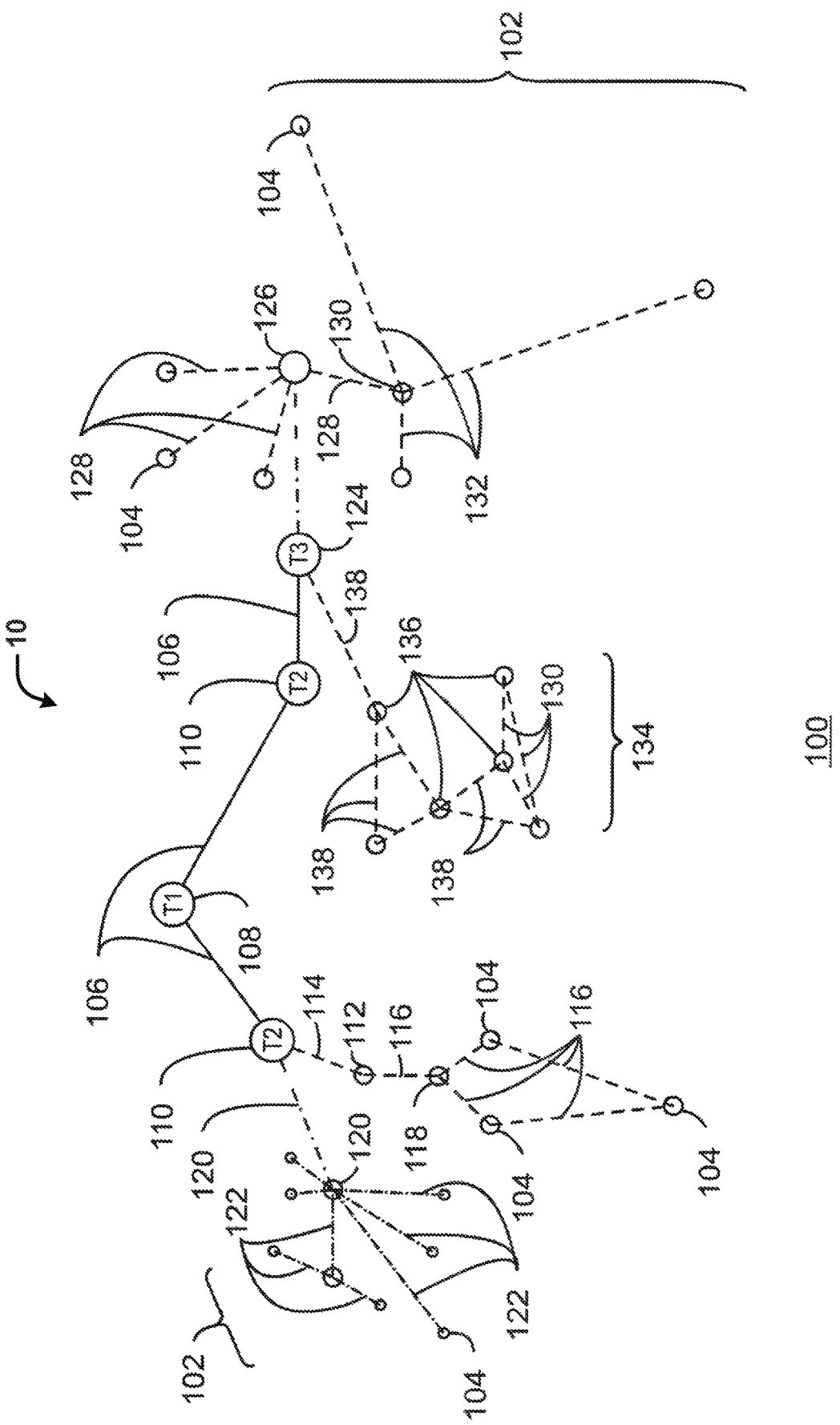
FIG. 1 illustrates an arrangement showing interconnections that may be present between a network and Internet of Things (IoT) networks, in accordance with various embodiments.

Apparatuses, methods and storage medium associated with consolidated device infrastructure (CDI) system for rapid service delivery are disclosed herein. In embodiments, CDI is a methodology and system for creating a common interface and service bus, enabling the ability to create virtualizing pools of heterogeneous, shared computing resources into a cloud-like managed infrastructure to be used across multiple groups requiring access to device hardware for test, debug, and development purposes. CDI may be configured provide the common interconnect, implementation, and service interfaces for heterogeneous systems (resources) for access and allocation as well as a full catalogue of service offerings based on the infrastructure capability and features.

In embodiments, CDI may allow for the sharing of resources across global development teams, with elastic access to infrastructure located anywhere, in order to satisfy customer requirements according to their cost and usage criteria. Furthermore, the resource location and infrastructure allocation may remain opaque to the user and appear as a dynamic, elastic infrastructure and pool of computer and/or mechanical devices.

In the description to follow, the concept of the CDI globally accessible shared service bus and dynamic infrastructure identification, allocation, and distribution of resources, as well as the technology behind the infrastructure interfaces which create the service coupling between the user of the resource and the resource itself while obfuscating the actual relationship, will be further detailed.

Reference will be made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Aspects of the disclosure are disclosed in the accompanying description. Alternate embodiments of the present disclosure and their equivalents may be devised without parting from the spirit or scope of the present disclosure. It should be noted that like elements disclosed below are indicated by like reference numbers in the drawings.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in the figure(s). A process may correspond to a method, a function, a procedure, a subroutine, a subprogram, and the like. When a process corresponds to a function, its termination may correspond to a return of the function to the calling function and/or the main function. Furthermore, a process may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium. A code segment may represent a procedure, a function, a subprogram, a program, a routine, a subroutine, a module, program code, a software package, a class, or any combination of instructions, data structures, program statements, and the like.

As used herein, the term "circuitry" may refer to, be part of, or include an Application Specific Integrated Circuit (ASIC), a Field Programmable Gate Array (FPGA), an electronic circuit, a processor (shared, dedicated, or group), a graphics processing unit (GPU), and/or memory (shared, dedicated, or group) that execute one or more software or firmware programs having machine instructions (generated from assembler instructions or compiled from higher level language instructions), a combinational logic circuit, and/or other suitable components that provide the described functionality. As used herein, the term "module" may include logic (including operating systems or application instructions, data, etc.) at least partially operable in circuitry. The circuitry may implement the module to cause the module to perform operations described herein. As used herein, the term "memory" may represent one or more hardware devices for storing data, including random access memory (RAM), magnetic RAM, core memory, read only memory (ROM), magnetic disk storage mediums, optical storage mediums, flash memory devices and/or other machine readable mediums for storing data. The term "computer-readable medium" may include, but is not limited to, memory, portable or fixed storage devices, optical storage devices, wireless channels, and various other mediums capable of storing, containing or carrying instruction(s) and/or data.

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof, such as cellular phones or smart phones, tablet personal computers, wearable computing devices, an autonomous sensors, laptop computers, desktop personal computers, video game consoles, digital media players, handheld messaging devices, personal data assistants, an electronic book readers, augmented reality devices, Universal Serial Bus (USB) hubs, Keyboard Video Mouse (KVM) switches/hubs, docking stations, port replicators, server computer devices (e.g., stand-alone, rack-mounted, blade, etc.), cloud computing services/systems, network elements, and/or any other like electronic devices. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

As used herein, the term "network element" may refer to one or more computer devices or one or more electronic devices that provide (or provide access to) one or more wired or wireless networks. A "network element" may be considered synonymous to and/or referred to as a networked computer, networking hardware, network equipment, access point, router, switch, hub, bridge, gateway, base station, core network element, server, and/or other like device. The term "network element" may describe equipment that provides radio baseband functions for data and/or voice connectivity between a network element and one or more users.

As used herein, the term "computing resource", "hardware resource", "resource", etc., may refer to a physical or virtual device, a physical or virtual component within a computing environment, and/or physical or virtual component within a particular device, such as computer devices, mechanical devices, memory space, processor/CPU time and/or processor/CPU usage, hardware time or usage, electrical power, input/output operations, ports or network sockets, channel/link allocation, throughput, and/or the like. As used herein, the term "network resource" may refer to computing resources that are accessible by computer devices via a communications network.

The internet of things (IoT) is a concept in which a large number of computing devices are interconnected to each other and to the Internet to provide functionality and data acquisition at very low levels. As used herein, an IoT device may include a semiautonomous device performing a function, such as sensing or control, among others, in communication with other IoT devices and a wider network, such as the Internet. Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet may include very large numbers of IoT devices. Accordingly, as described herein, a number of innovations for the future Internet address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software. The services may be provided in accordance with the Quality of Service (QoS) terms specified in service level and service delivery agreements. The use of IoT devices and networks present a number of new challenges in a heterogeneous network of connectivity comprising a combination of wired and wireless technologies as depicted in FIGS. 1 and 2.

Figure 2:
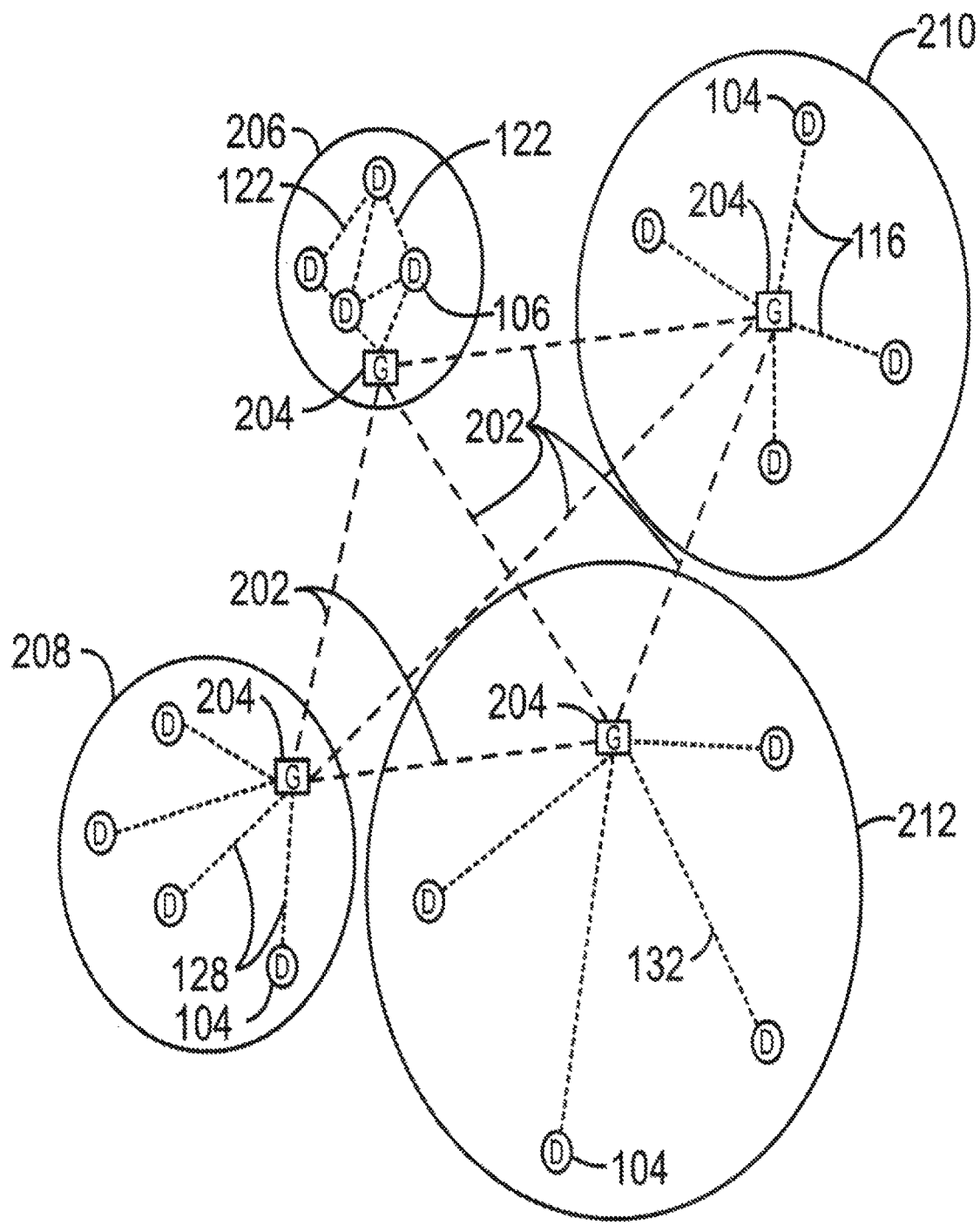
FIG. 2 illustrates an example domain topology, in accordance with various embodiments.

FIG. 1 illustrates an arrangement 10 showing interconnections that may be present between the Internet 100 and IoT networks, in accordance with various embodiments. The interconnections may couple smaller networks 102, down to the individual IoT device 104, to the fiber backbone 106 of the Internet 100. To simplify the drawing, not every device 104, or other object, is labeled.

In FIG. 1, top-level providers, which may be termed tier 1 providers 108, are coupled by the fiber backbone of the Internet to other providers, such as secondary or tier 2 providers 110. In one example, a tier 2 provider 110 may couple to a tower 112 of an LTE cellular network, for example, by further fiber links, by microwave communications 114, or by other communications technologies. The tower 112 may couple to a mesh network including IoT devices 104 through an LTE communication link 116, for example, through a central node 118. The communications between the individual IoT devices 104 may also be based on LTE communication links 116. In another example, a high-speed uplink 120 may couple a tier 2 provider 110 to a gateway (GW) 120. A number of IoT devices 104 may communicate with the GW 120, and with each other through the GW 120, for example, over BLE links 122.

The fiber backbone 106 may couple lower levels of service providers to the Internet, such as tier 3 providers 124. A tier 3 provider 124 may be considered a general Internet service provider (ISP), for example, purchasing access to the fiber backbone 110 from a tier 2 provider 110 and providing access to a corporate GW 126 and other customers. From the corporate GW 126, a wireless local area network (WLAN) can be used to communicate with IoT devices 104 through Wi-Fi® links 128. A Wi-Fi link 128 may also be used to couple to a low power wide area (LPWA) GW 130, which can communicate with IoT devices 104 over LPWA links 132, for example, compatible with the LoRaWan specification promulgated by the LoRa alliance.

The tier 3 provider 124 may also provide access to a mesh network 134 through a coordinator device 136 that communicates with the tier 3 provider 124 using any number of communications links, such as an LTE cellular link, an LPWA link, or a link 138 based on the IEEE 802.15.4 standard, such as Zigbee®. Other coordinator devices 136 may provide a chain of links that forms cluster tree of linked devices.

IoT devices 104 may be any object, device, sensor, or "thing" that is embedded with hardware and/or software components that enable the object, device, sensor, or "thing" capable of capturing and/or recording data associated with an event, and capable of communicating such data with one or more other devices over a network with little or no user intervention. For instance, in various embodiments, IoT devices 104 may be abiotic devices such as autonomous sensors, gauges, meters, image capture devices, microphones, machine-type communications (MTC) devices, machine-to-machine (M2M) devices, light emitting devices, audio emitting devices, audio and/or video playback devices, electro-mechanical devices (e.g., switch, actuator, etc.), and the like. In some embodiments, IoT devices 104 may be biotic devices such as monitoring implants, biosensors, biochips, and the like. In other embodiments, an IoT device 104 may be a computer device that is embedded in a computer system and coupled with communications circuitry of the computer system. In such embodiments, the IoT device 104 may be a system on chip (SoC), a universal integrated circuitry card (UICC), an embedded UICC (eUICC), and the like, and the computer system may be a mobile station (e.g., a smartphone) or user equipment, laptop PC, wearable device (e.g., a smart watch, fitness tracker, etc.), "smart" appliance (e.g., a television, refrigerator, a security system, etc.), and the like.

Each of the IoT devices 104 may include one or more memory devices and one or more processors to capture and store/record data. Each of the IoT devices 104 may include appropriate communications circuitry (e.g., transceiver(s), modem, antenna elements, etc.) to communicate (e.g., transmit and receive) captured and stored/recorded data. Further, each IoT device 104 may include other transceivers for communications using additional protocols and frequencies. This is discussed further with respect to FIGS. 5-9. According to various embodiments, the IoT devices 104 may be equipped with information (e.g., referred to as "modem profiles" herein) to configure configurable communications circuitry to perform communications in a corresponding communications. This may allow the IoT devices 104 to communicate using multiple wireless communications protocols without requiring an IoT device 104 to include separate hardware communications modules for each wireless communications protocol. The wireless communications protocols may be any suitable set of standardized rules or instructions implemented by the IoT devices 104 to communicate with other devices, including instructions for packetizing/depacketizing data, instructions for modulating/demodulating signals, instructions for implementation of protocols stacks, and the like. For example, IoT devices 104 may include communications circuitry that is configurable to communicate in accordance with one or more person-to-person (P2P) or personal area network (PAN) protocols (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/BLE protocols; ANT protocols; Z-Wave; LTE D2D or ProSe; UPnP; and the like); configurable to communicate using one or more LAN and/or WLAN protocols (e.g., Wi-Fi-based protocols or IEEE 802.11 protocols, such as IEEE 802.16 protocols); one or more cellular communications protocols (e.g., LTE/LTE-A, UMTS, GSM, EDGE, Wi-MAX, etc.); and the like. In embodiments, one or more of tower 112, GW 120, 126, and 130, coordinator device 136, and so forth, may also be incorporated with the embodiments described herein, in particular, with references to FIGS. 5-13.

The technologies and networks may enable the exponential growth of devices and networks. As the technologies grow, the network may be developed for self-management, functional evolution, and collaboration, without needing direct human intervention. Thus, the technologies will enable networks to function without centralized controlled systems. The technologies described herein may automate the network management and operation functions beyond current capabilities.

FIG. 2 illustrates an example domain topology 200 that may be used for a number of IoT networks coupled through backbone links 202 to GWs 204, in accordance with various embodiments. Like numbered items are as described with respect to FIG. 1. Further, to simplify the drawing, not every device 104, or communications link 116, 122, 128, or 132 is labeled. The backbone links 202 may include any number of wired or wireless technologies, and may be part of a local area network (LAN), a wide area network (WAN), or the Internet. Similar to FIG. 1, in embodiments, one or more of IoT devices 104, GW 204, and so forth, may be incorporated with embodiments described herein, in particular, with references to FIGS. 5-13.

The network topology 200 may include any number of types of IoT networks, such as a mesh network 206 using BLE links 122. Other IoT networks that may be present include a WLAN network 208, a cellular network 210, and an LPWA network 212. Each of these IoT networks may provide opportunities for new developments, as described herein. For example, communications between IoT devices 104, such as over the backbone links 202, may be protected by a decentralized system for authentication, authorization, and accounting (AAA). In a decentralized AAA system, distributed payment, credit, audit, authorization, and authentication systems may be implemented across interconnected heterogeneous infrastructure. This allows systems and networks to move towards autonomous operations.

In these types of autonomous operations, machines may contract for human resources and negotiate partnerships with other machine networks. This may allow the achievement of mutual objectives and balanced service delivery against outlined, planned service level agreements as well as achieve solutions that provide metering, measurements and traceability and trackability. The creation of new supply chain structures and methods may enable a multitude of services to be created, mined for value, and collapsed without any human involvement.

The IoT networks may be further enhanced by the integration of sensing technologies, such as sound, light, electronic traffic, facial and pattern recognition, smell, vibration, into the autonomous organizations. The integration of sensory systems may allow systematic and autonomous communication and coordination of service delivery against contractual service objectives, orchestration and quality of service (QoS) based swarming and fusion of resources.

The mesh network 206 may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 208 may use systems that perform standards conversion to provide multi-standard connectivity, enabling IoT devices 104 using different protocols to communicate. Further systems may provide seamless interconnectivity across a multi-standard infrastructure comprising visible Internet resources and hidden Internet resources.

Communications in the cellular network 210 may be enhanced by systems that offload data, extend communications to more remote devices, or both. The LPWA network 212 may include systems that perform non-Internet protocol (IP) to IP interconnections, addressing, and routing.

Figure 3:
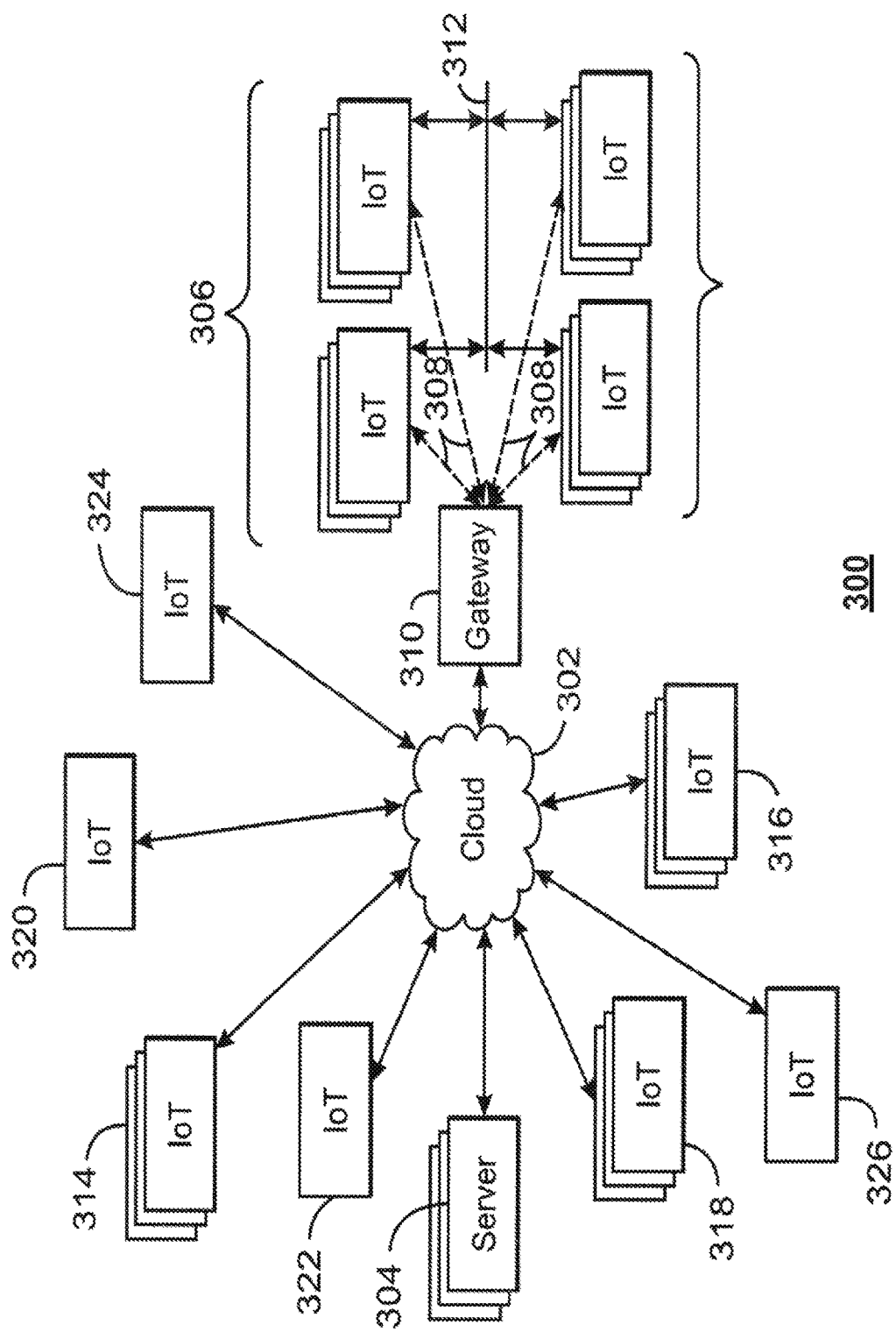
FIG. 3 illustrates an example cloud computing network or cloud in communication with a number of IoT devices, in accordance with various embodiments.

FIG. 3 illustrates an example cloud computing network, or cloud 302, in communication with a number of Internet of Things (IoT) devices, in accordance with various embodiments. The cloud 302 may represent the Internet, one or more cellular networks, a local area network (LAN) or a wide area network (WAN) including proprietary and/or enterprise networks for a company or organization, or combinations thereof. Components used for such communications system can depend at least in part upon the type of network and/or environment selected. Protocols and components for communicating via such networks are well known and will not be discussed herein in detail. However, it should be appreciated that cloud 302 may be associated with network operator who owns or controls equipment and other elements necessary to provide network-related services, such as one or more base stations or access points, and one or more servers for routing digital data or telephone calls (for example, a core network or backbone network).

The IoT devices in FIG. 3 may be the same or similar to the IoT devices 104 discussed with regard to FIGS. 1-2. The IoT devices may include any number of different types of devices, grouped in various combinations, such as IoT group 306 that may include IoT devices that provide one or more services for a particular user, customer, organizations, etc. A service provider may deploy the IoT devices in the IoT group 306 to a particular area (e.g., a geolocation, building, etc.) in order to provide the one or more services. In one example, the IoT group 306 may be a traffic control group where the IoT devices in the IoT group 306 may include stoplights, traffic flow monitors, cameras, weather sensors, and the like, to provide traffic control and traffic analytics services for a particular municipality or other like entity. Similar to FIGS. 1-2, in embodiments, one or more of IoT devices 314-324, GW 310, and so forth, may be incorporated with the various embodiments described herein, in particular, with references to FIGS. 5-14. For example, in some embodiments, the IoT group 306, or any of the IoT groups discussed herein, may include the client 501 and/or one or more devices D1-DN discussed infra with regard to FIGS. 5-11.

The IoT group 306, or other subgroups, may be in communication with the cloud 302 through wireless links 308, such as LPWA links, and the like. Further, a wired or wireless sub-network 312 may allow the IoT devices to communicate with each other, such as through a local area network, a wireless local area network, and the like. The IoT devices may use another device, such as a GW 310 to communicate with the cloud 302. Other groups of IoT devices may include remote weather stations 314, local information terminals 316, alarm systems 318, automated teller machines 320, alarm panels 322, or moving vehicles, such as emergency vehicles 324 or other vehicles 326, among many others. Each of these IoT devices may be in communication with other IoT devices, with servers 304, or both.

As can be seen from FIG. 3, a large number of IoT devices may be communicating through the cloud 302. This may allow different IoT devices to request or provide information to other devices autonomously. For example, the IoT group 306 may request a current weather forecast from a group of remote weather stations 314, which may provide the forecast without human intervention. Further, an emergency vehicle 324 may be alerted by an automated teller machine 320 that a burglary is in progress. As the emergency vehicle 324 proceeds towards the automated teller machine 320, it may access the traffic control group 306 to request clearance to the location, for example, by lights turning red to block cross traffic at an intersection in sufficient time for the emergency vehicle 324 to have unimpeded access to the intersection.

In another example, the IoT group 306 may be an industrial control group (also referred to as a "connected factory", an "industry 4.0" group, and the like) where the IoT devices in the IoT group 306 may include machines or appliances with embedded IoT devices, radiofrequency identification (RFID) readers, cameras, client computer devices within a manufacturing plant, and the like, to provide production control, self-optimized or decentralized task management services, analytics services, etc. for a particular manufacturer or factory operator. In this example, the IoT group 306 may communicate with the servers 304 via GW 310 and cloud 302 to provide captured data, which may be used to provide performance monitoring and analytics to the manufacturer or factory operator. Additionally, the IoT devices in the IoT group 306 may communicate among each other, and/or with other IoT devices of other IoT groups, to make decisions on their own and to perform their tasks as autonomously as possible.

Clusters of IoT devices, such as the IoT groups depicted by FIG. 3, may be equipped to communicate with other IoT devices as well as with the cloud 302. This may allow the IoT devices to form an ad-hoc network between the devices, allowing them to function as a single device, which may be termed a fog device. This is discussed further with respect to FIG. 4.

Figure 4:
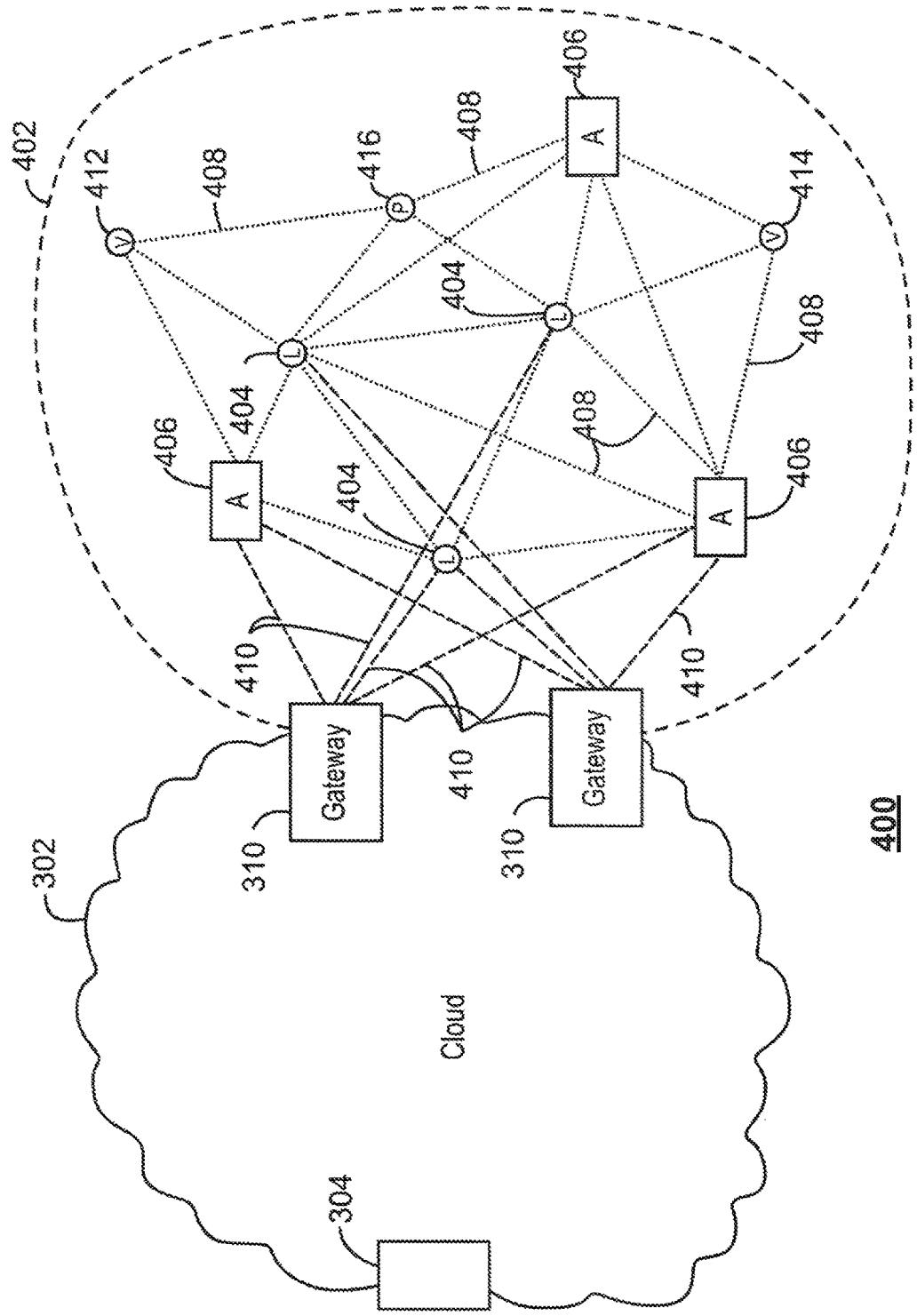
FIG. 4 illustrates an arrangement of a cloud computing network or cloud in communication with a mesh network of IoT devices or IoT fog, in accordance with various embodiments.

FIG. 4 illustrates an arrangement 400 of a cloud computing network, or cloud 302, in communication with a mesh network of IoT devices, which may be termed a fog device 402, operating at the edge of the cloud 302, in accordance with various embodiments. Like numbered items are as described with respect to FIGS. 1-3. In this example, the fog device 402 is a group of IoT devices at an intersection. The fog device 402 may be established in accordance with specifications released by the OpenFog Consortium (OFC), the Open Connectivity Foundation™ (OCF), among others.

Data may be captured, stored/recorded, and communicated among the IoT devices 404. Analysis of the traffic flow and control schemes may be implemented by aggregators 406 that are in communication with the IoT devices 404 and each other through a mesh network. Data may be uploaded to the cloud 302, and commands received from the cloud 302, through GWs 310 that are in communication with the IoT devices 404 and the aggregators 406 through the mesh network. Similar to FIGS. 1-3, in embodiments, one or more of IoT devices 404, aggregators 406, and so forth, may be incorporated with the various embodiments described herein, in particular, with references to FIGS. 5-14. For example, in some embodiments, the fog device 402, or any of grouping of devices discussed herein, may include the client 501 and/or one or more devices D1-DN discussed infra with regard to FIGS. 5-11.

Any number of communications links may be used in the fog device 402. Shorter-range links 408, for example, compatible with IEEE 802.15.4 may provide local communications between IoT devices that are proximate to one another or other devices. Longer-range links 410, for example, compatible with LPWA standards, may provide communications between the IoT devices and the GWs 310. To simplify the diagram, not every communications link 408 or 410 is labeled with a reference number.

The fog device 402 may be considered to be a massively interconnected network wherein a number of IoT devices are in communications with each other, for example, by the communication links 408 and 410. The network may be established using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the AllJoyn protocol from the AllSeen alliance, the optimized link state routing (OLSR) Protocol, or the better approach to mobile ad-hoc networking (B.A.T.M.A.N), among many others.

Communications from any IoT device may be passed along the most convenient path between any of the IoT devices to reach the GWs 310. In these networks, the number of interconnections may provide substantial redundancy, allowing communications to be maintained, even with the loss of a number of IoT devices.

Not all of the IoT devices may be permanent members of the fog device 402. In the example in the drawing 400, three transient IoT devices have joined the fog device 402, a first mobile device 412, a second mobile device 414, and a third mobile device 416. The fog device 402 may be presented to clients in the cloud 302, such as the server 304, as a single device located at the edge of the cloud 302. In this example, the control communications to specific resources in the fog device 402 may occur without identifying any specific IoT device 404 within the fog device 402. Accordingly, if any IoT device 404 fails, other IoT devices 404 may be able to discover and control a resource. For example, the IoT devices 404 may be wired so as to allow any one of the IoT devices 404 to control measurements, inputs, outputs, etc., for the other IoT devices 404. The aggregators 406 may also provide redundancy in the control of the IoT devices 404 and other functions of the fog device 402.

In some examples, the IoT devices may be configured using an imperative programming style, e.g., with each IoT device having a specific function and communication partners. However, the IoT devices forming the fog device 402 may be configured in a declarative programming style, allowing the IoT devices to reconfigure their operations and communications, such as to determine needed resources in response to conditions, queries, and device failures. This may be performed as transient IoT devices, such as the devices 412, 414, 416, join the fog device 402. As transient or mobile IoT devices enter or leave the fog 402, the fog device 402 may reconfigure itself to include those devices. This may be performed by forming a temporary group of the devices 412 and 414 and the third mobile device 416 to control or otherwise communicate with the IoT devices 404. If one or both of the devices 412, 414 are autonomous, the temporary group may provide instructions to the devices 412, 414. As the transient devices 412, 414, and 416, leave the vicinity of the fog device 402, it may reconfigure itself to eliminate those IoT devices from the network. The fog device 402 may also divide itself into functional units, such as the IoT devices 404 and other IoT devices proximate to a particular area or geographic feature, or other IoT devices that perform a particular function. This type of combination may enable the formation of larger IoT constructs using resources from the fog device 402.

As illustrated by the fog device 402, the organic evolution of IoT networks is central to maximizing the utility, availability and resiliency of IoT implementations. Further, the example indicates the usefulness of strategies for improving trust and therefore security. The local identification of devices may be important in implementations, as the decentralization of identity ensures a central authority cannot be exploited to allow impersonation of objects that may exist within the IoT networks. Further, local identification lowers communication overhead and latency.

Figure 5:
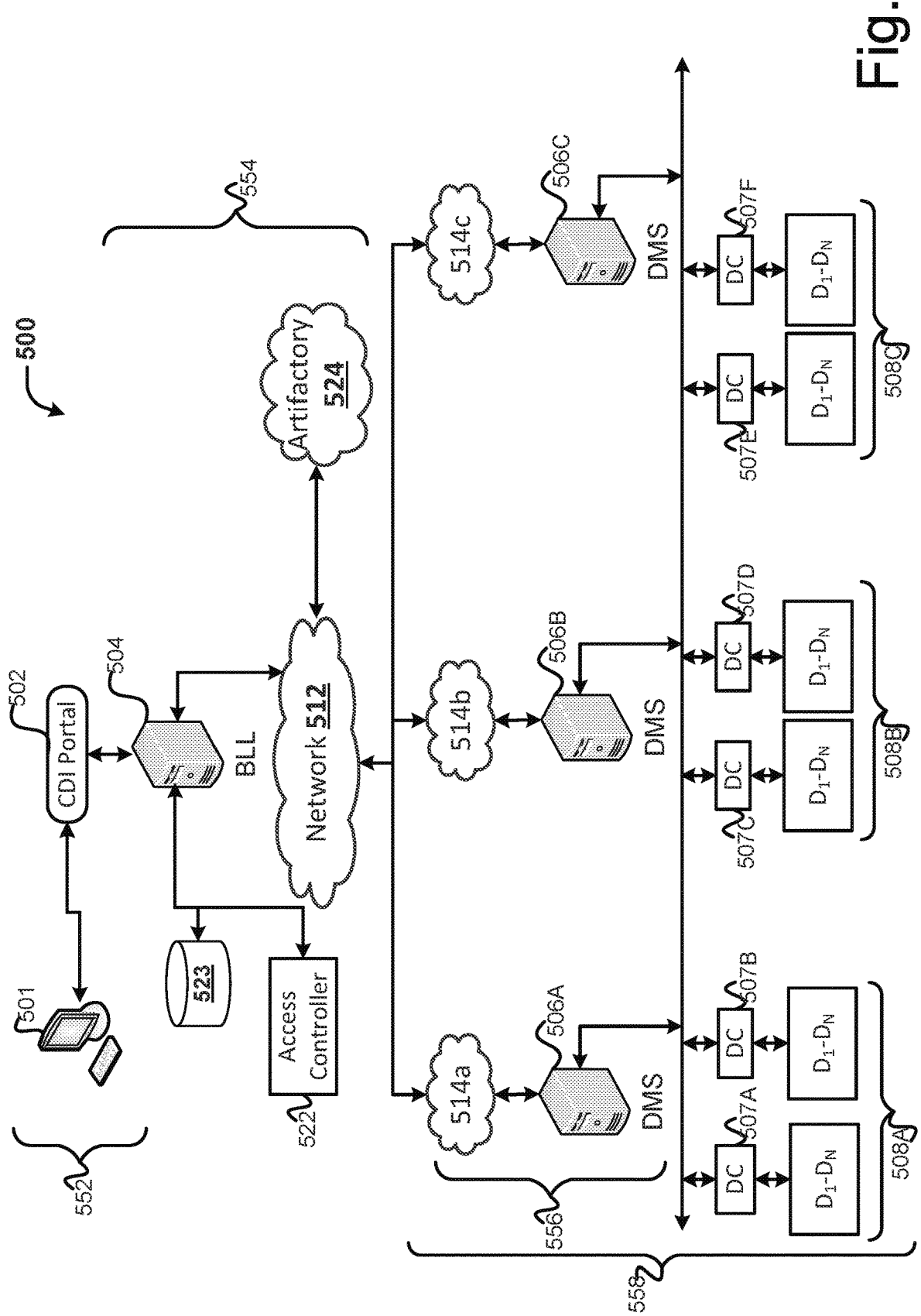
FIG. 5 illustrates an architectural view of the CDI technology of the present disclosure, according to various embodiments.

Referring now to FIG. 5, wherein an architectural view of the Consolidated Device Infrastructure (CDI) technology of the present disclosure, according to various embodiments, is shown. As illustrated, a CDI system 500 may include a CDI portal 502, one or more servers 504 hosting a business logic layer (BLL) (also referred to as "BLL server 504", "BLL 504", and the like), a number of device management servers (DMS) 506A-C (collectively referred to as "DMS 506") disposed or deployed at various regions 508A-C (collectively referred to as "regions 508"), and a number of device controllers (DCs) 507A-F (collectively referred to as "device controllers 507" or "DCs 507") that are communicatively coupled with a corresponding set (or subset) of devices D1-DN, incorporated with the teachings of the present disclosure.

In some implementations, the CDI system 500 may be part of an enterprise network, where various locations of the enterprise may be globally dispersed in diverse geographic areas. In other implementations, a cloud computing service and one or more connected data centers may implement the CDI system 500. For example, the CDI portal 502, BLL 504, metadata repository 523, access controller 522, network 512, and artifactory 524 may be provided as part of a cloud computing service, while the DMSes 506, DCs 507, and devices D1-DN may be connected to data centers that serve the cloud computing service.

In either implementation, the services of the CDI system 500 may be accessed by a client 501 via the CDI portal 502. Client 501 may be a physical hardware computer device that is capable of recording, storing, and/or transferring digital data, and capable of running one or more applications. Client 501 may include one or more memory devices, one or more processors (or processor circuitry), communications circuitry (e.g., a transmitter/receiver, a transceiver, RF circuitry, network interface controllers, etc.) one or more sensors (e.g., accelerometers, gyroscopes, image sensors, Global Positioning System ("GPS") receiver, etc.), and/or other like components. Client 501 may communicate with the server(s) 504 in accordance with one or more wireless or wired communications protocols as discussed herein.

The client 501 may be capable of operating application(s) for communicating with the server(s) 504 via the CDI portal 502. These applications may be native applications, web applications, and/or hybrid applications that may generate and render various interfaces of the CDI portal 502. Such applications may developed with using website development tools and/or programming languages (e.g., HTML, Cascading Stylesheets (CSS), JavaScript, Jscript, Ruby, Python, etc.) and/or using platform-specific development tools (e.g., Android® Studio™ integrated development environment (IDE), Microsoft® Visual Studio® IDE, Apple® iOS® software development kit (SDK), etc.). In an example, processor circuitry of the client 501 may implement or operate the application to request and obtain data from server(s) 504. The processor circuitry implementing or operating the application may decode the date and render graphical user interfaces (GUIs) in a container of application or a web browser. The GUIs may provide visual representations of data residing in the enterprise/cloud or otherwise provided by the server(s) 504, such as data associated with resources provided by devices D1-DN.

Each cluster of servers 506A-C may include web-based or non-web-based services and any number of corresponding DCs 507 within a device region 508A-C (collectively referred to as "device regions 508", "regions 508", and the like), where each of the DCs 507 may include or control a corresponding set/subset of devices D1-DN. The web-based services may include representational state transfer (REST) web services, Rich Site Summary (RSS) services, Message Queue Telemetry Transport (MQTT) services, and/or any other suitable messaging service; while the non-web-based services may include publish-subscription (pub/sub) type messaging, and/or any other suitable messaging service. Each region 508 may be any physical or logical grouping of multiple DCs 507 and/or devices D1-DN. Examples of regions 508 may include geographic regions; business units within an enterprise; individual local area networks, individual enterprise networks; local/edge cloud systems; fog computing systems; systems represented via hypervisors and/or virtual machines, containers, and/or partitioned systems which can be functionally isolated; and the like. Each of the regions 508 may be distributed around the world and may use any means to connect with the infrastructure of the CDI system 500.

The DCs 507 may be any type of computer device or electronic device that provides interconnection between corresponding devices D1-DN. Examples of DCs 507 may include network elements (e.g., hubs, switches, routers, GWs, aggregators, repeaters, bridges, console servers or terminal servers, etc.), USB hubs, equipment racks, circuit breakers, docking stations, port replicators, and the like. In some embodiments, the DCs 507 be a relay module or I/O controller, such as an RS-232/485 relay module, a USB relay (e.g., an 8-channel USB relay (USB-RLY08)), an Ethernet relay, a programmable compute board (e.g., Arduino board, Intel® Edison board, Raspberry Pi board, etc.) programmed as a relay module, a field-programmable device (FPD) programmed as a relay module, and the like. In some embodiments, the DC 507 may be one of the aforementioned relay modules or I/O controllers.

Each of the devices D1-DN may be a computer device or electronic device that includes its own hardware resources and/or network resources, and in various embodiments, the devices D1-DN may be controlled through CDI. Additionally, one or more of the devices D1-DN may be a computable system or computable device, which may be an electronic device developed for a single purpose or configured to perform one or more function without being repurposed for performing other functions. Examples of devices D1-DN may include, but are not limited to IoT devices (e.g., the IoT devices and/or fog devices discussed previously), gateway devices (e.g., the GWs and aggregators discussed previously), machine-type communication (MTC) devices, machine-to-machine (M2M) devices, cellular phones and/or smartphones, tablet computer devices, information technology (IT) devices, servers, desktop computer devices, laptop computer devices, wearable computer devices (e.g., watches and the like), sensors such as accelerometers or other like microelectromechanical system (MEMS) (e.g., (e.g., sensors 720 discussed with regard to FIG. 7), compute boards (e.g., Arduino board, Intel® Edison board, Raspberry Pi board, etc.), compute nodes, small form factor compute and computable devices, unmanned aerial vehicles (UAVs), drones, robots, electromechanical devices (e.g., EMCs 722 discussed with regard to FIG. 7), etc. In some embodiments, the devices D1-DN may also include one or more DCs 507.

CDI, as will be appreciated from the description to follow may comprise the technology of common service bus, which may provide global access to a collection of tools resources, and hardware fixtures, wrapped in a multi-tier architecture. The common service bus may be trusted or untrusted based on the operator/owner requirements and/or usage/implementations. In the case of a trusted service bus, the access may include the device/system level root of trust as well as certificates, which enable a certificate chain. One goal of the embodiments discussed herein is to facilitate the rapid identification and allocation of a local or remote target device(s) and create a semi-permanent cluster or cloud access, in order to implement a temporary best fit infrastructure service for the duration the user customers' need and use.

Server(s) 504 and servers 506A-C may be coupled to each other via network 512 and local area networks 514*a-c* at the various locations. Server(s) 504 may also be coupled to and have access to an access controller 522 that controls access to the CDI system 500, and metadata repository 523, which may be a database configured to store metadata for implementing various embodiments discussed herein. In embodiments, the access controller 522 may be a Single Sign On (SSO) service and the like. The server(s) 504 may also be coupled to and have access to the access controller 522 and metadata repository 523, using Enterprise Access Management (EAM), Lightweight Directory Access Protocol (LDAP), and/or some other suitable protocol. Server(s) 504 may also be communicatively coupled with and have access to artifactory 524, which may be a repository and repository manager for Docker Registry, Maven Repository, Gradle, NuGet, Debian, npm, Docker, Python and/or RubyGems.

The features implemented at the various servers 504 and 506A-506C may be provide four tiers of CDI functionalities including a presentation tier 552, a logic tier 554, a data tier 156, and a hardware fixture tier 558.

The presentation tier 552 may provide, at common portal 502, a common interface to the underlying infrastructure, allowing users remote access to a pool of target devices D1-DN dispersed at diverse geography areas for the purpose of test, debugging, development experimentation, and examination.

The logic tier 554 may provide, at server(s) 504, a business logic layer with a common autonomous interface to the underlying infrastructure, allowing remote view and access to a pool of target devices D1-DN selected from available devices D1-DN dispersed at diverse geographic areas for the purpose of testing, debugging, development, configuration, experimentation, and examination by test infrastructure and automation. The logic tier 554 may facilitate the proper identification of the suitable devices D1-DN for the purpose of the testing, debugging, development, experimentation, configuration, etc. Additionally, embodiments allow for access to tooling and test equipment for the manipulation and analysis of target devices D1-DN selected from available devices D1-DN. The logic tier 554 may also extend and expand the presentation layer 552 and automation interface to provide an abstraction layer enabling the infrastructure to be program agnostic while allowing various components and/or devices D1-DN to be added or removed as new opportunities arise while meeting existing customer requirements.

The data tier 156 may provide, collectively by DMS 506A-C, a common collection of devices D1-DN hardware which can be used as needed by the CDI to carry out tasks needing commutation and/or storage.

The hardware fixture tier 558 may provide, collectively by DMS 506A-C, a pooled collection of project target devices D1-DN which can be used as needed by users or infrastructure to carry out testing, debugging, development, experimentation, and/or examination tasks for both hardware and software implementations. The hardware fixture tier 558 may provide, collectively by DMS 506A-C, a pooled collection of test and analysis equipment to enable global access to specialty tools attached to target devices D1-DN to enhance test, debug, development experimentation, and examination tasks. The hardware fixture tier 558 may provide, collectively by DMS 506A-C, centralized target device management to maximize device utilization while reducing the need to provide excessive hardware on a program-by-program basis.

Still referring to FIG. 5, in embodiments, the BLL provided by server(s) 504 may be implemented with a reservation and scheduling module (also referred to as a "reservation module"), a heartbeat module, a security module, a device configuration module, and an imaging module.

The reservation module may be configured to check for existence of computing resources available in the ecosystem (e.g., resources provided by one or more devices D1-DN) and then either reserve/schedule the resources immediately for use and/or remove them from being oversubscribed. Any type of known scheduling, retention and/or intelligent placement algorithm may be used to schedule the resources. During an initialization phase of the CDI system 500, the reservation module may obtain capability and/or functionality information, which may be updated during provisioning/de-provisioning of the container (e.g., a Docker container), partitions (e.g., Linux, Windows, etc.), or VM. The reservation module may obtain the capability and/or functionality information on a static basis (e.g., obtaining the capability and/or functionality information from metadata repository 523), a dynamic basis (e.g., communicating with DMS 506 and/or devices to obtain a current status on the fly), and/or a semi-static (e.g., obtaining capability information from an intermediary device, or from both the repository 523 and by polling the DMS 506 or devices) In embodiments, the capability information may define the various attributes and/or parameters of the devices D1-DN such as device or component type/model, device or component attributes, silicon stepping or stepping level, platform architecture, operating system type and/or version, currently installed software applications, available memory, desired amount of computing or network resources that may be used for testing purposes, attached devices/peripheral devices, communications capabilities (e.g., wireless and/or wired network capabilities, as well as supported communications protocols), etc. The functionality information may refine the capability information based on past behavior(s), precision, confidence in the capability, and/or reduction in features and/or functions based on anomalies or temporary or intermittent failures. The functionality information can be used to refine the specificity of the resource and/or device that is identified and allocated to a project.

The device configuration module may be configured to register, view, and/or alter device metadata and associated device hardware configuration and available telemetry. The imaging module may be configured to define or alter the location, name, and/or attributes of a container (such as a Docker Container) or virtual machine (VM) to be used for providing device or computing resources. The imaging module may acquire docker or VM images and content from local or remote repositories, such as the artifactory 524.

The security module may be configured to give access to the tools, resources, or pools of hardware on a per-user, per-group, or per-connecting system basis. The security module may also generate security keys and perform various authentication procedures. The security module may also create and store signatures that identify provisioned resource(s) as one or more records that are related to a reservation request. For example, when a provisioning request is sent to the DMS 506 as metadata, and a container is created, a signature may also be created and recorded in the container using a defined pattern that will match an algorithm known by the BLL 504. The security module may receive the signature and may associate the signature with the reservation request that was the basis for provisioning the resources.

The heartbeat module may be configured to receive state of hardware data in the ecosystem and move the resource off-line or on-line. During system operation, health of devices/resources being tested/monitored to see if devices/resources are fulfilling their function(s) (e.g., to learn of any outages, overload scenarios, etc.). In embodiments, the heartbeat module may obtain hardware state information (HSI) may indicate the state of resources that are provided by the devices D1-DN and/or a mode of operation of the devices D1-DN that are providing resources. For example, the heartbeat module may poll a provisioned VM or container on a periodic basis and/or in response to a trigger (e.g., a request and the like) for the operational status (e.g., HSI) of the devices D1-DN during various points while resources are supposed to be used. In some embodiments, the heartbeat module may listen for attach/detach commands in the VM/container, which may have been provided by the devices D1-DN.

In embodiments, the device management services provided by DMSes 506A-C may be implemented with a provisioning module, an unprovisioning module, a heartbeat module and a recovery module.

The provisioning module may be configured to create service coupling between the user of the resource and the resource itself. In embodiments, there may be three types of service couplings between the user of the resource and the resource. The first coupling type may be a tight coupling, which indicates a relatively strong relationship between the requirement and the device and/or resource. The tight coupling may be permanent and/or repeatable. Additionally, the tight coupling used when the requirement can only be met by specific resources or devices with specific capabilities or functionalities. The second coupling type may be a loosely coupling, which indicates that there is greater reusability and less interdependence between the features of the device/resource and the user/requirement when compared to the first coupling type. The third coupling type may be an ad-hoc coupling, which may be used when the requirement can be met by virtually any or all resources or devices. For ad-hoc couplings, the provisioning module may use an algorithm for placement based on location and collocation, distance/time, cost, and/or other like factors/criteria. Some methods in the provisioning may include checking hardware availability and state, cleaning up last provision request state if needed, creating the semi-permanent service coupling, applying commands and security permissions against the assets and return final provision status, state, and metadata to the BLL 504.

The unprovisioning module may be configured to remove the service coupling between the user of the resource. Unprovisioning may include calling a tear down process that removes identified resources from the container/VM, removes or cleans up any IP tables and/or routing tables, reinitializes the resource into a known ready state, and destroys the container by removing any trace of the previous resource configuration and any content that may have resided in the container. In some embodiments the unprovisioning module may identified resources to be removed based on a request sent from the BLL 504 to the DMS 506. The unprovisioning module may search for resources or pool of resources that have a signature matching the resources indicated by the request. Upon successfully removing the resources, a status indication may be sent back to the BLL 504, if desired.

The heartbeat module may be configured to monitor the state of the device and report if state changes. The heartbeat module can describe the resources known in the ecosystem to allow proper monitoring, communicating to the recovery module to take corrective measures to attempt recovery of lost or unavailable resources, identify resources available for provisioning, and unprovisioning. The heartbeat module can be localized to the resources on the DMS 506 to continually monitor and track the state of resources known. When state changes occur, the state may be noted and corrective actions can be taken, for example, by the recovery module discussed infra. As an example, states may be indicated by values, such as a value of 0 indicating that a device/resource is available and can be provisioned for use; a value of 1 indicating that a device/resource is available but already in use; a value of 2 indicating that a device/resource is available but not in a state that can be used; and a value of 3 indicating that a device/resource is available but not in state that can be used, and needs action to try to recover the resource either.

The recovery module may be configured to detect the state of the hardware (e.g., HIS tracked by the heartbeat module) and attempt to recover the hardware. Some examples of corrective actions that can be taken include attempting to recover a resource when the resource was in use and is no longer available. Some examples of such a corrective action may include power cycling the resource, resetting the resource, and/or attempting to change a mode of operation of the resource to place the resource into desired state or mode of operation. For example, when a device operates the Android operating system (OS) and the heartbeat module detects that the device is currently in the Android safe mode, the recovery module may attempt to place device back into the Android normal mode. If the attempted recovery is successful, the recovery module may report the successful recovery, and/or may resend a workload to the recovered resource. In some embodiments, the recovery module may not resend the workload to the resource, or the recovery module may locate and send the workload to an alternative resource. If the attempted recovery fails, the recovery module may report resource the failure, or the recovery module may locate and send the workload to an alternative resource. In some embodiments, the recovery module may not attempt recovery of a resource, and may instead report the status and/or locate and send workloads to an alternative resource.

Together, the functions/services provided common portal 502, server(s) 504 and servers 506A-C may create a globally accessible management domain, in which the interfaces, on-boarding and registration methods may enable the management of heterogeneous elements which cross the platform and CPU architecture boundaries. Furthermore, the CDI system 500 may be used to identify, harvest, retain and maintain allocation on these elements via a global inventory system, which manages the elements or ingredients within the management domain via static and dynamic metadata and indexes.

The management pool may maintain multiple types of inventory, assets, and resources. An inventory may be an asset when it is off-line, in the maintenance pool, or removed from service but not disposed of or discarded. An inventory is a resource when it is available, actively managed, and provisionable. An inventory may become a resource once it is provisioned. Every available and addressable element in the inventory may be considered an asset, but only when an element is assigned or available for use are they considered to be resources. The resource pool may be managed through a dynamic service bus (which may be trusted or untrusted as discussed previously), and abstracted at the BLL 504. The BLL 504 may maintain a near-real time inventory control and maintain service delivery control for all the resources, including their availability and assignment. In embodiments, this service bus may also be used for managing the planning and optimization of the resource allocation in order to actively and precisely assign the best fit resource based on its capability characteristic(s) and the probability of being able to fulfill the requirements of the service. Furthermore, the service bus may also be used for optimal assignment of the proper resources with their dynamic service characteristics which define their ability to be part of a cluster or ad-hoc cloud supporting the customer's use or workload(s). In this way, the user may be assured the most optimal assignment of resources based on their service requirements without awareness of the physical location, time zone or country in which their equipment resides. In summary, the CDI technology of the present disclosure may obfuscate the fulfillment of the IT service from the IT equipment delivering the capability.

In embodiments, the functions/services provided by common portal 502 and server(s) 504 may jointly include a matching algorithm, which may begin with a guided identification and simplification of the customers' requirement and associated service level agreements (SLA). The matching algorithm may then take the request and initialize a service probe, which may then traverse the service bus enabled resource domain in order to create an optimization routing over the best fit resources in order to locate, assign, create and retain a cluster or cooperating systems for use for the duration of the customers' purpose. Additionally, the functions/services provided by common portal 502, server(s) 504 and servers 506*a*-506*c* may maintain near-real time tracking on the physical resources and actively traces the service route, in order to ensure that the service level agreement is maintained in the cluster of systems during the cluster's operation. Upon cancellation or completion of the service contract, the resources may be returned into the free pool and are again available for use.

In embodiments, the functions/services provided by common portal 502, server(s) 504, 506 may provide different categories of resources. Each of the services discussed previously (e.g., testing, debugging, experimentation, examination, etc.) may be a category of resources. However, many other service planes may be enabled based on the capabilities within the particular devices D1-DN and/or within a management domain, such as secure enclave systems/services, crypto systems/services, high physical security systems/services (e.g., Tempest), and the like. Using different categories of services may allow for categorization based on capability, essentially a highly service oriented active filter.

Additionally, resource oversubscription is not possible (or at least highly unlikely) since the allocation and registration methods implemented by the functions/services provided by common portal 502 and server(s) 504, 506 protect the resource retention and assignment to the service owner. Oversubscription may be actively managed based on elements such as service level agreements (SLAs) with the owner/requestor of the service (e.g., platinum, gold, silver subscriptions, etc.); the length of time for retention of the resource; and the request/resource coupling type (e.g., tightly coupled, loosely coupled, or ad-hoc coupling as described previously).

Before further describing the CDI technology of the present disclosure, except for the CDI technology of the present disclosure incorporated therein, server(s) 504 and servers 506 may be any one of a number of computer servers known in the art, having processors with uni or multi-cores, memory, storage and input/output (I/O) devices. Similarly, except for their usage for facilitating network connections between server(s) 504, 506, enterprise network 512 and local area networks 514a-c may be any one of a number of wired and/or wireless networks known in the art, having gateways, routers, switches and so forth. Further, while for ease of understanding, only one BLL server 504 and only three DMS 506A-C disposed/deployed at three locations are illustrated in FIG. 5, the present disclosure is not so limited, and may include any number of devices/elements depicted by FIG. 5 and any number of enterprise locations, subject only to the capacity and bandwidth of the equipment deployed.

Figure 6:
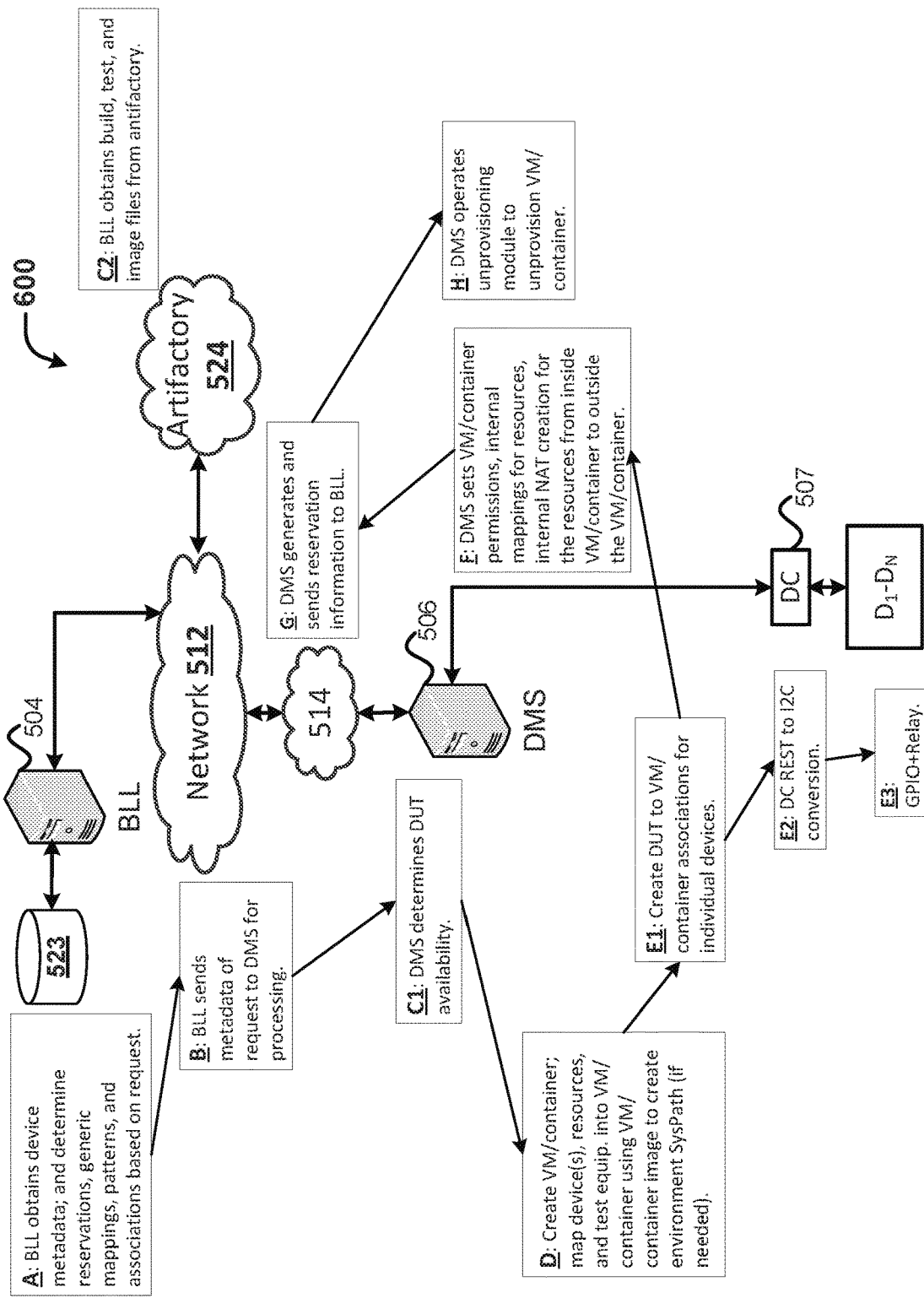
FIG. 6 illustrates an example operation flow between the various components of the CDI technology of the present disclosure, according to various other embodiments.

Referring now to FIG. 6, wherein an example operation flow between the various components of the CDI technology of the present disclosure, according to various embodiments, is illustrated. Process 600 may include operations at nodes A through H, which may be performed by the earlier described functions of server(s) 504 and 506A-C.

During an initialization phase of the CDI system 500, devices D1-DN may be registered by the BLL 504, or the devices D1-DN may self-register with the BLL 504. Registration of the devices D1-DN may include collecting and storing a set of device metadata in one or more databases (e.g., metadata repository 523). In some implementations, devices may be registered by calling the BLL 504 to store the device metadata in the metadata repository 523. The device metadata may describe each device, and may include device identifying information (e.g., a unique identifier), address information (e.g., an IP address, IP route, etc.), and some or all of the capability information described herein (e.g., device type, component types, computing resources, one or more features, etc.). In some embodiments, the metadata may be a loosely coupled set of relationships with a minimal amount of data necessary to describe a device (e.g., an integer value that has a relationship to a model or type and some basic routing information). The device metadata can then be combined with other device metadata to describe a larger pool of available resources that can be utilized. Once the set of metadata are stored, individual devices or groups of devices may be allocated to one or more pools of devices (also referred to as "resource pools"). Once the devices are registered, the client 501 may utilize the CDI portal 502 to call the BLL 504 with a request to reserve a device or pool of like devices to perform desired tasks or actions, which may be referred to as a "workloads."

Referring to FIG. 6, process 600 may begin at node A, where a request for resource(s) may be received by the BLL hosted by server 504 from any location of a multi-location enterprise. The request for resource(s) may also be referred to as a resource request, a service request, a reservation request, and/or the like. For example, client 501 may implement an application to obtain and render interfaces of the CDI portal 502 in an application container or browser, and to submit a request for resources via the interfaces of the CDI portal 502. The various interfaces of the CDI portal 502 may include various graphic control elements (e.g., buttons, check boxes, radio boxes, text input boxes, sliders, scroll bars, etc.) that allow a user of the client 501 to select desired resources to request. The handling of all requests and responses, (e.g., requests for item information and the information provided in response) as well as the delivery of content between the client 501 and the BLL server 504 may be handled by one or more web servers (not shown) and/or one or more application servers (not shown).

In embodiments, the resource request may include information for requested resources or services provided by various devices D1-DN. For example, the resource request may indicate particular device attributes (e.g., device or component type/model, device or component attributes, silicon stepping or stepping level, platform architecture, operating system type and/or version, etc.) for a test, experiment, etc.

In some embodiments, the resource request may indicate particular services that the user would like to use for testing, experimentation, etc. As used herein, a "service" may be any operation or collection of operations that perform a function or function(s). The services may include monitoring and/or analyzing event-based data, accessing and/or controlling one or more devices D1-DN, and/or the like. For example, a "temperature control" service may include controlling a thermostat, opening/closing windows, opening/closing air duct vents, changing level of blinds based on the time of day, etc. In another example, a "cellular voice call service" may include controlling one or more cell phones or other cellular network-enabled devices of one or more platforms to call a desired phone number. Furthermore, each of the devices D1-DN may be used by multiple services even when different ones of the devices D1-DN are provided by different vendors, manufacturers, service providers, etc. For example, a device D1-DN that opens/closes a window may be used for both a temperature control service and a security monitoring service. In some embodiments, the resource request may indicate a time period and/or time intervals for utilizing the requested resources (referred to as a "time bound request"). In some embodiments, the resource request may be workload dependent wherein the resource request indicates desired resources before, during, or after one or more processes, actions, or tasks are performed or completed.

At node B, a query may be made from the BLL server 504 to the DMS 506 for available devices D1-DN to operate as device test equipment or Devices Under Test (DUTs). In embodiments, the query may be based on the resource request obtained at node A, and the BLL 504 may translate or convert the resource request into a suitable format for consumption by the DMS 506. The query may indicate required attributes for the devices D1-DN (e.g., device or component type/model, device or component attributes, silicon stepping or stepping level, platform architecture, operating system type and/or version, hardware and/or software system requirements, etc.). Additionally, the query may indicate required workload requirements (e.g., throughput capabilities, benchmark capabilities, performance capabilities, response time capabilities, etc.), operations-based requirements, or time-based requirements.

In some embodiments, the BLL 504 may query the metadata repository 523 using parameters based on information in the request, and may send the request (or information contained therein) to the DMS 506 to determine if the requested resource(s) is/are available. In some embodiments, the BLL 504 may directly query the DC 507 if the DC 507 is acting as the DMS 506 in addition to performing DC-related functions. If the requested resource is available, then the DMS 506 may report the availability to the BLL 504, and the BLL 504 may reserve the resource for a period of time. The period of time may be predefined or may be included in the request. The BLL 504 may then send metadata to the DMS 506, which would then attempt provisioning of the resources (see e.g., node C1 discussed infra), and if successful, confirmation of the reserved resources is sent from the DMS 506 to the BLL 504 (see e.g., node G discussed infra). If all or part of the resources could not be found or reserved, then the DMS 506 may communicate the unavailability to the BLL 504. In some embodiments, the requested resources can be placed in a queue for later usage, new resources can be found, or the request may be dropped and failure may be reported.

At node C1, device D1-DN availability may be determined by the DMS 506. For example, the DMS 506 may implement the heartbeat module to determine device D1-DN availability, or the availability of specific resources within each device D1-DN. In some embodiments, the heartbeat module may send requests for hardware state information (HSI) to the DC 507, and may receive the HSI from the DC 507. The information about the available devices D1-DN or available resources (e.g., the HSI) may be sent back to the BLL server 504 (e.g., to a heartbeat module implemented by the BLL 504), and in response, a subset of selected devices D1-DN may be indicated to the DMS 506 by the BLL server 504. This indication may be referred to as a "resource request". The resource request may instruct the DMS 506 to allocate services/resources for the selected devices/resources. In some embodiments, the available devices D1-DN may be conveyed to the client 501 via the CDI portal 502 and the client 501 may select the subset of devices D1-DN, while in other embodiments, the BLL server 504 (e.g., the reservation module discussed previously) may select the subset of devices D1-DN based on the resource request obtained at node A.

If one or more devices D1-DN of the subset of devices D1-DN are available and selected/allocated by the DMS 506, metadata may be sent from the BLL server 504 to the DMS 506 to create/provision virtual machines (VMs) or containers (e.g., Docker containers) with the required attributes per the resource request. If no devices D1-DN of the subset of devices D1-DN are available, the resource request may be put into queue and the client 501 and/or a campaign/project requestor may be informed by, for example the BLL 504, that request has been queued (and additional communication may occur as soon as the campaign/project starts).

At node C2, the BLL 504 may obtain build, test, and image files from the artifactory 524, for example, when one or more devices D1-DN of the subset of devices D1-DN is available. In embodiments, the build, test, and image files may include program code, configurations, etc. for building an environment for operating the devices D1-DN and for running tests, experiments, etc. using the devices D1-DN. For example, the DMS 506 may obtain VM image or a container image for provisioning/creating a VM or container at the DMS 506. A VM may be an emulation of a computer device or computer system including an OS and underlying hardware architecture. A container may be a software package that is isolated from other packages or applications that may be executed on the same hardware infrastructure. One difference between containers and VMs is that containers may share a host kernel/OS with other containers, while VMs include operate their own (guest) OS/kernel. The VM image may comprise one or more virtual hard disk (VHD) files that represent a physical disk of the VM; and the VHD may comprise data required to operate the VM (e.g., system files, data files, file-system information, etc.), the OS within the VM, and application(s) running inside the OS. The container image may be a stand-alone executable package for implementing the container, which may comprise a runtime environment, system tools, system libraries, settings, application code, processes/applications to execute when the container is launched, etc.

At node D, the DMS 506 may implement the provisioning module to perform resource provisioning based on the metadata. For example, the metadata may include (or be a part of) the VM image or container image (e.g., Docker image) discussed previously, which may be obtained from the BLL server 504. In embodiments, the VM image or container image may include applications/program code to execute upon provisioning. The program code/applications may create device D1-DN to VM/container associations for individual devices D1-DN, and generate/allocate a device mapping (discussed infra regarding node E1).

In embodiments, the provisioning module may also provide metadata and a system paths (syspaths) list, Internet Protocol (IP) addresses, and networking information if a device requires a container mapping. In this way, the requesting user may access the device(s) via the container/VM. In embodiments, the provisioning module may also provide security keys in the container/VM to secure the container/VM. The security keys may be provided to the provisioning module from an upstream entity (e.g., the security module of the BLL 504), and the security keys may be available for the duration of the reservation.

At node E1, the provisioning module of the DMS 506 may generate/allocate VM or container (e.g., Docker container) to device associations, and may generate a device mapping based on the VM/container-device associations. In embodiments, the device mapping (also referred to as a "device map", "connections map", and the like) may indicate connections (also referred to as "channels", "links", and the like) between the VM/container and individual devices D1-DN. The connections may indicate how the VM/container may access the individual devices D1-DN using a VM/container environment, as well as the connections into the system associated test or peripheral device equipment from the VM/container environment. For example, in embodiments where the DMS 506 is implemented by a Reduced Instruction Set Computing (RISC) processor-based server, a virtual input/output (vI/O) subsystem of the RISC server may provide a pseudo-view of connected entities and may determine the required network mapping for the reservation. The vI/O subsystem may then execute on the request and give a virtual address for accessing the reserved resources, and communications between the client 501 and the resources may be handled by the vI/O subsystem. The connections may include any suitable means for communications between devices, including, but not limited to Ethernet, USB, USB over IP or USB over Ethernet, KVM over IP, and the like.

In embodiments, the mapping may indicate the syspaths, the IP addresses, the ports or sockets, networking information, and/or logical connections between the VM/container and individual devices D1-DN. In one example, a logical connection to the individual devices D1-DN may be used if no syspath is needed, which may be the case when the device is a server, desktop, compute board, etc. If KVM resources are requested, such resources may also be allocated to the VM/container. In embodiments, the connections indicated by the device map (e.g., IP addresses, ports, etc.) may be sent back to the BLL 504, and the BLL 504 may provide the connections for display by a user interface (UI) via the CDI portal 502 or the BLL 504 may provide the connections to a calling service to be used by that service.

At node F, the DMS 506 may implement the provisioning module to set VM or container permissions, internal mappings for resources, internal network address translation (NAT) creation for the resources inside the VM/container to the outside world, mapping of host system resources if needed, and/or other like functions. In embodiments, the DMS 506 may set these parameters by forming a virtual cluster of the allocated resources. In alternate embodiments, various ones of these operations can also be done as a script run inside the container or VM that is run at time of VM/container creation.

At node G, completed reservation information of the DMS 506 (or virtual cluster of the DMS 506) of the allocated resources may be sent back from the DMS 506 to the BLL 504. In embodiments, a response message may include reservation information. The reservation information may indicate a connection to a device D1-DN (e.g., an IP address of the device), and one or more of a video port, a file port, a secure shell (SSH) port, and any additional ports needed or wanted to be returned to the calling system (e.g., client 501) for use. The reservation information may also indicate a status (or status information) of reserved resources, such as whether the resources are currently available, available at a particular time or date, and the like. The reservation information or status information may also indicate whether the reservation request failed and/or a reason for the failure, and/or whether the request was accepted or rejected and a reason for the rejection. For example, if a failure occurs, the reservation information may indicate whether the failure was due to a network connection error, a failure to obtain a VM/container image, failure to properly provision a selected VM/container, etc. In another example, if the reservation request was rejected, the reservation information indicate whether the reservation request was rejected by the DMS 506, one or more of the DCs 507, and/or one or more particular devices D1-DN.

At node E1 and/or E2, the provisioned VM/container may use the connections to connect with the devices D1-DN via the DC 507 to access the requested resources when scheduled. This may include sending REST messages to the DC 507. At node E2, the DC 507 may convert REST messages (or information contained therein) to inter-integrated circuit (I2C or I2C) message(s) or other like commands/signals for accessing the resources of the devices D1-DN. In one example, commands or parameters used for accessing and controlling the devices D1-DN, as provided by application(s) running in the VM/container environment, may be converted into I2C commands, parameters, messages, control signals, etc. Other parameters, messages, control signals, etc. may be used to access the resources in other embodiments, such as Small Computer System Interface (SCSI) Parallel Interface (SPI) signals/messages, Joint Test Action Group (JTAG) protocol signals/messages, universal asynchronous receiver/transmitter (UART) protocol signals/messages, Musical Instrument Digital Interface (MIDI) protocol signals/messages, GSM/LTE AT commands, etc.

At node E3, the DC 507 may perform general-purpose input/output (GPIO) operations based on the I2C messages, commands, parameters, etc. to access the resources of the devices D1-DN. In embodiments, the DC 507 may be capable of directly accessing the devices D1-DN. Additionally or alternatively, the DC 507 may access or control a suitable relay module or I/O controller, such as an RS-232/485 relay module, a USB relay (e.g., USB-RLY08), an Ethernet relay, a programmable compute board (e.g., Arduino board, Intel® Edison board, Raspberry Pi board, etc.) programmed as a relay module, and the like.

At node H, the DMS 506 may implement the unprovisioning module to tear down and/or clean-up the VM/containers based on an unprovision request, which may be sent by the BLL 504. In embodiments, the unprovisioning module may uninstall or delete the VM/container according to known procedures. This procedure may include removing all of the metadata, security keys, data, etc. that were used during the reservation.

Figure 7:
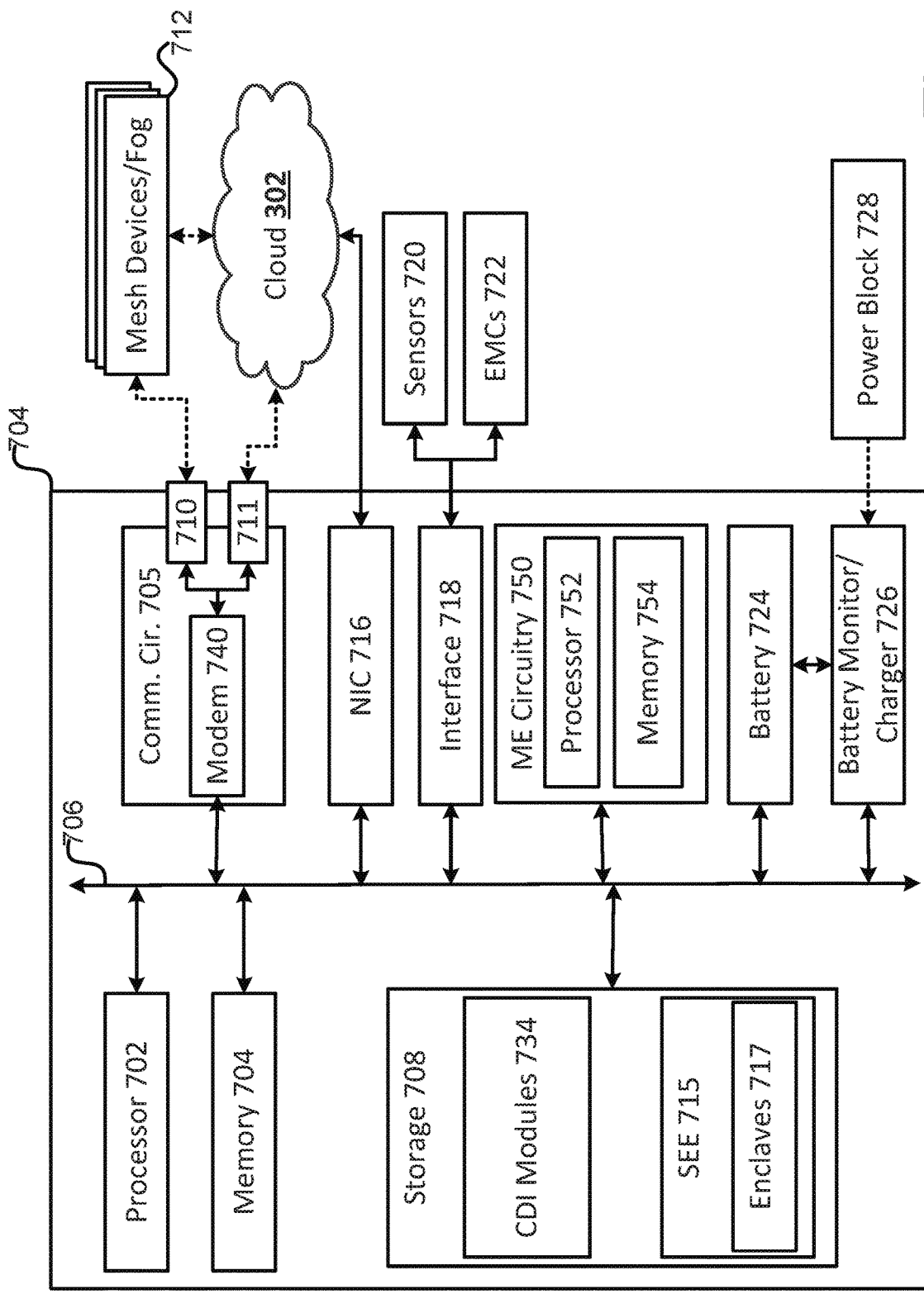
FIG. 7 illustrates an example implementation of a computing platform suitable for practicing various aspects of the present disclosure, according to various embodiments.

FIG. 7 illustrates an example implementation of a computing platform 704, in accordance with various embodiments. In embodiments, the computing platform 704 may be suitable for use as IoT device 104, IoT devices 314-324, GW 310, IoT devices 404, devices D1-DN, client 501, servers 504 and 506, and/or any other element/device discussed previously with regard to FIGS. 1-6. FIG. 7 shows a block diagram of an example of components that may be present in the computing platform 704. The computing platform 704 may include any combinations of the components shown in the example. The components may be implemented as ICs, portions thereof, discrete electronic devices, or other modules, logic, hardware, software, firmware, or a combination thereof adapted in the computing platform 704, or as components otherwise incorporated within a chassis of a larger system. The block diagram of FIG. 7 is intended to show a high level view of components of the computing platform 704. However, some of the components shown may be omitted, additional components may be present, and different arrangement of the components shown may occur in other implementations.

The computing platform 704 may include a processor 702, which may be a microprocessor, a multi-core processor, a multithreaded processor, an ultra-low voltage processor, an embedded processor, or other known processing element. The processor 702 may be a part of a system on a chip (SoC) in which the processor 702 and other components are formed into a single integrated circuit, or a single package, such as the Edison™ or Galileo™ SoC boards from Intel. As an example, the processor 702 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A9 processor from Apple® Inc., a Snapdragon™ processor from Qualcomm® Technologies, Inc., or an OMAP™ processor from Texas Instruments, Inc.

Additionally or alternatively, processor 702 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of processor 702 may comprise logic blocks or logic fabric including and other interconnected resources that may be programmed to perform various functions, such as the procedures, methods, functions, etc. of the various embodiments discussed herein. In such embodiments, the circuitry of processor 702 may include memory cells (e.g., erasable programmable read-only memory (EPROM), electrically erasable programmable read-only memory (EEPROM), flash memory, static memory (e.g., static random access memory (SRAM), anti-fuses, etc.) used to store logic blocks, logic fabric, data, etc. in lookup-tables (LUTs) and the like.

The processor 702 may communicate with a system memory 704 over a bus 706. Any number of memory devices may be used to provide for a given amount of system memory. As examples, the memory can be random access memory (RAM) in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard, such as LPDDR3 or LPDDR4 that will offer extensions to LPDDR2 to increase bandwidth. In various implementations the individual memory devices may be of any number of different package types such as single die package (SDP), dual die package (DDP) or quad die package (Q17P). These devices, in some embodiments, may be directly soldered onto a motherboard to provide a lower profile solution, while in other embodiments the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. For example, a memory may be sized between 2 GB and 16 GB, and may be configured as a DDR3LM package or an LPDDR2 or LPDDR3 memory, which is soldered onto a motherboard via a ball grid array (BGA).

To provide for persistent storage of information such as data, applications, operating systems and so forth, a mass storage 708 may also couple to the processor 702 via the bus 706. To enable a thinner and lighter system design the mass storage 708 may be implemented via a solid state disk drive (SSDD). Other devices that may be used for the mass storage 708 include flash memory cards, such as SD cards, microSD cards, xD picture cards, and the like, and USB flash drives. In low power implementations, the mass storage 708 may be on-die memory or registers associated with the processor 702. However, in some examples, the mass storage 708 may be implemented using a micro hard disk drive (HDD). Further, any number of new technologies may be used for the mass storage 708 in addition to, or instead of, the technologies described, such resistance change memories, phase change memories, holographic memories, or chemical memories, among others. For example, the computing platform 704 may incorporate the 3D XPOINT memories from Intel® and Micron®.

The operating systems (OSs) may be a general purpose operating system or an operating system specifically written for and tailored to the computing platform 704. The OSs may include one or more libraries or APIs, which provide program code and/or software components for one or more applications to obtain and use the data from the secure execution environment (SEE) 715 and/or the ME circuitry 750. The SEE 715, the ME circuitry 750, or both the SEE 715 and ME circuitry 750 may be referred to as a trusted execution environment (TEE) and the like.

In embodiments, the memory 704 and/or storage 708 may be divided into one or more trusted memory regions 717 for storing applications or software modules of the SEE 715. These trusted memory regions may be hardware enforceable containers called enclaves 717, secure enclaves, and the like. The enclaves 717 may be one or more isolated regions of memory 704 and/or storage 708 that are encrypted within the memory 704 and/or storage 708, and only decrypted inside the processor 702. The secure enclaves 717 may be used to store security critical code and/or data, such as secure applications (not shown) and/or an enclave OS (not shown). The memory 704 and/or storage 708 may be divided into multiple enclaves 717, wherein each enclave may include its own applications and/or data. From a physical point of view, enclave data is resident within registers, caches, and/or other logic blocks inside the application circuitry or host architecture (e.g., processor 702, memory 704, storage 708, etc.). Unauthorized access via untrusted software is prevented by processor logic. Whenever enclave data leaves the on-package caches to be written to memory 704 and/or storage 708, the data is automatically encrypted and integrity protected, which reduces the likelihood enclave data will be viewed, modified, or replayed. In some embodiments, the enclaves may be defined and managed by a virtual machine monitor (VMM) of a virtual machine running as a guest OS. Any suitable VMM may be used to define the secure enclaves. In various embodiments, the SEE 715 may be one or more secure enclaves defined using the Intel® SGX instructions. A detailed discussion of enclave establishment and operation (including communication between two or more enclaves, and between an enclave and remote devices) is discussed in the commonly assigned Int'l App. No. PCT/US2016/037634 and U.S. application Ser. No. 15/473,370, both of which are incorporated by reference in their entireties.

The components may communicate over the bus 706. The bus 706 may include any number of technologies, including industry standard architecture (ISA), extended ISA (EISA), peripheral component interconnect (PCI), peripheral component interconnect extended (PCIx), PCI express (PCIe), a Time-Trigger Protocol (TTP) system, or a FlexRay system, or any number of other technologies. The bus 706 may be a proprietary bus, for example, used in a SoC based system. Other bus systems may be included, such as an I2C interface, an SPI interface, point to point interfaces, and a power bus, among others.

The bus 706 may couple the processor 702 to the modem circuitry 740 (also referred to as "baseband circuitry 740", "modem 740", and the like) for communications with other devices. In some embodiments, the modem 740 may comprise one or more memory devices, one or more processors used to perform various operations to communicate in accordance with one or more wireless communications protocols (e.g., where each processor is dedicated implement a particular protocol stack of a corresponding wireless protocol), one or more audio digital signal processor(s) (DSP) including elements for compression/decompression and echo cancellation, and may include other suitable processing elements in other embodiments. The processors of the modem 740 may be the same or similar to the processor 702 discussed previously. In various embodiments, modem 740 may interface with the application circuitry of the computing platform 704 (e.g., processor(s) 702, memory 704, and storage 708) for generation and processing of the signals and for controlling operations of the transceivers 710, 711.

The modem 740 may process signals received from receive signal paths of the transceivers 710, 711 and generate signals for transmit signal paths of the transceivers 710, 711. The modem 740 may be used to handle various radio control functions that enable communication with one or more radio networks via the transceivers 710, 711 according to one or more particular wireless communications protocols. The radio control functions may include, but are not limited to, signal modulation/demodulation, encoding/decoding, radio frequency shifting, implementing protocol stacks, and the like. In some embodiments, modulation/demodulation by the modem 740 may include Fast-Fourier Transform (FFT), precoding, and/or constellation mapping/demapping functionality. In some embodiments, encoding/decoding circuitry of the modem 740 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments. The modem 740 may pass demodulated signals obtained from the transceivers 710, 711 to other components of the computing platform 704, and may pass modulated signals to the transceivers 710, 711 for transmission to other devices.

The transceiver 710 (also referred to as a "mesh transceiver" and the like) may be used for communications with other mesh devices 712, which may be included in a fog as discussed previously. The mesh transceiver 710 may use any number of frequencies and protocols. For example, when the modem 740 is configured with an IEEE 802.15.4 standard MP 577, the mesh transceiver 710 may transmit/receive signals in the 2.4 gigahertz (GHz) range as specified by the IEEE 802.15.4 standard. Upon detection of a trigger, the modem 740 may be configured to utilize other wireless communications protocols for communicating with mesh devices 712, such as the Bluetooth® low energy (BLE) standard, as defined by the Bluetooth® Special Interest Group, or the ZigBee® standard, among others. The modem 740 may be configured for any particular wireless communications protocol for the connections to the mesh devices 712. For example, a WLAN MP 577 may be used to implement Wi-Fi™ communications in accordance with the Institute of Electrical and Electronics Engineers (IEEE) 802.11 standard. In addition, wireless wide area communications, for example, according to a cellular or other wireless wide area protocol, can occur via a wireless wide area network (WWAN) MP 577 or via a specific cellular network MP 577.

The mesh transceiver 710 may include multiple radios (e.g., including hardware devices such as switches, filters, amplifiers, antenna elements, and the like to facilitate the communications over the air) to communicate using multiple standards for communications at different range. For example, the computing platform 704 may communicate with close devices (e.g., within about 10 meters) using a local transceiver based on BLE, or another low power radio, to save power. More distant mesh devices 712 (e.g., within about 50 meters) may be reached over ZigBee or other intermediate power radios. Both communications techniques may take place over a single radio at different power levels, or may take place over separate transceivers/radios, for example, a local transceiver/radio using BLE and a separate mesh transceiver/radio using ZigBee. Utilizing different wireless communications protocols may or may not include utilizing different radios within the mesh transceiver 710. The mesh transceiver 710 may be incorporated into an MCU as an address directly accessible by the chip, such as in the Curie® units available from Intel.

The transceiver 711 (also referred to as a "cloud transceiver" and the like) may include one or more radios (e.g., including hardware devices such as switches, filters, amplifiers, antenna elements, and the like to facilitate the communications over the air) to communicate with devices in the cloud 302. For example, when the modem 740 is configured with an LPWA MP 577 that follows the IEEE 802.15.4 or IEEE 802.15.4g standards, among others, the cloud transceiver 711 may transmit/receive signals in the 2.4 GHz range as specified by the IEEE 802.15.4/g standards. Upon detection of a trigger, the modem 740 may be configured to utilize other wireless communications protocols for communicating over the cloud 302, such as LoRaWAN™ (Long Range Wide Area Network) developed by Semtech and the LoRa Alliance, one or more WiFi protocols, and/or one or more cellular protocols discussed herein. Utilizing different wireless communications protocols may or may not include utilizing different radios within the cloud transceiver 711. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 710 and uplink transceiver 711, as described herein. For example, the radio transceivers 710 and 711 may include an LTE or other cellular transceiver that uses spread spectrum (SPA/SAS) communications for implementing high speed communications, such as for video transfers. Further, any number of other protocols may be used, such as Wi-Fi® networks for medium speed communications, such as still pictures, sensor readings, and provision of network communications.

The transceivers 710 and 711 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology. Other Third Generation Partnership Project (3GPP) radio communication technology that may be used includes UMTS (Universal Mobile Telecommunications System), FOMA (Freedom of Multimedia Access), 3GPP LTE (Long Term Evolution), 3GPP LTE Advanced (Long Term Evolution Advanced), 3GPP LTE Advanced Pro (Long Term Evolution Advanced Pro)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+ (High Speed Packet Access Plus), UMTS-TDD (Universal Mobile Telecommunications System-Time-Division Duplex), TD-CDMA (Time Division-Code Division Multiple Access), TD-SCDMA (Time Division-Synchronous Code Division Multiple Access), 3GPP Rel. 8 (Pre-4G) (3rd Generation Partnership Project Release 8 (Pre-4th Generation)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13

(3rd Generation Partnership Project Release 13), 3GPP Rel. 14 (3rd Generation Partnership Project Release 14), 3GPP LTE Extra, LTE Licensed-Assisted Access (LAA), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard)), Wireless Gigabit Alliance (WiGig) standard, mmWave standards in general (wireless systems operating at 10-90 GHz and above such as WiGig, IEEE 802.11ad, IEEE 802.11ay, and the like. In addition to the standards listed above, any number of satellite uplink technologies may be used for the uplink transceiver 711, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 716 may be included to provide a wired communication to the cloud 302 or to other devices, such as the mesh devices 712. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, a Time-Trigger Protocol (TTP) system, or a FlexRay system, among many others. An additional NIC 716 may be included to allow connect to a second network, for example, a NIC 716 providing communications to the cloud over Ethernet, and a second NIC 716 providing communications to other devices over another type of network.

The bus 706 may couple the processor 702 to an interface 718 that is used to connect external devices. The external devices may include sensors 720, such as accelerometers, level sensors, flow sensors, temperature sensors, pressure sensors, barometric pressure sensors, and the like. The interface 718 may be used to connect the computing platform 704 to electro-mechanical components (EMCs) 722, which may allow computing platform 704 to change its state, position, and/or orientation, or move or control a mechanism or system. The EMCs 722 may include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, computing platform 704 may be configured to operate one or more EMCs 722 based on one or more captured events and/or instructions or control signals received from a service provider (e.g., an operator of the server(s) 304) and/or client 501. Additionally, the interface 718, sensors 720, and/or EMCs 722 may be collectively referred to as "event capture circuitry" and the like. In some embodiments, the event capture circuitry may also include battery monitor/charger 726, the processor 702, and/or other components in or coupled with platform 704.

ME circuitry 750 may be an isolated and tamper-resistant chipset, which is distinct from and generally operates independently of the processor 702. The ME circuitry 750 may be embodied as any number of hardware, firmware, and/or software modules configured to perform security, encryption, and/or authentication functions, as described herein. In some embodiments the ME circuitry 750 may be included in a graphics controller or graphics processing unit (GPU). In some embodiments, the ME circuitry 750 may be integrated into the application circuitry (e.g., a same circuit board or SoC as processor 702 and/or memory 704, etc.) or the communications circuitry 705 (e.g., a same circuit board or SoC as the modem circuitry 840, etc.). The ME circuitry 750 may additionally or alternatively include separate circuitry disposed on another circuit board or SoC that is communicatively coupled to the application circuitry and/or communications circuitry 705 via a signal path, such as bus 706. The ME circuitry 750 may be communicatively coupled to other components of the application circuitry via bus 706 and communicatively coupled to the communications circuitry 705 of the computing platform 704 via a separate bus, such as a private low pin count (LPC) serial bus the LPC serial bus that is not exposed to a host OS of the application circuitry.

ME circuitry 750 may include ME processor 752 and ME memory 754. ME memory 754 may store crypto operations, which is a set of cryptographic algorithms or operations used for generating keys and encrypting/decrypting data. The keys may be used to encrypt/decrypt data being communicated through the ME circuitry 750. In some embodiments, the keys may be generated based on one or more measurements of the application circuitry. However, any suitable algorithm or operations may be used for key generation and/or encrypting/decrypting data. ME processor 752 may be any processing device capable of executing software modules or program code independently of the other processors of the application circuitry and may include tamper-resistant characteristics. ME processor 752 may include one or more microprocessors, DSPs, cryptoprocessors, secure cryptoprocessors, cryptographic accelerators, secure controllers, and/or any other suitable device. The ME memory 754 may be embodied as one or more volatile and/or non-volatile memory devices. The ME memory 754 may store various data, including software/firmware executable by the ME processor 752 and data used for the various cryptographic operations, program code for an ME OS (not shown), keys, and crypto operations, and/or the like.

ME processor 752 may implement an ME OS, which may be a framework that provides OS like functionality to trusted applications, and provides an API for client applications to access trusted applications. The ME OS may also include internal ME APIs or libraries, such as a cryptographic operations API to provide cryptographic capabilities (for example, the cryptographic algorithms/operations of crypto operations) to trusted applications, a trusted storage API to provide trusted storage for keys and other data, and a secure element API that provides mechanisms for an application to open a connection with a secure element. In some embodiments, the ME OS may also include firmware or drivers that provide override mechanisms for tamper-resistant hardware devices, and firmware or drivers for verifying digital certificates, etc. These firmware modules may ensure that various conditions are met before any new applications are provisioned within the ME circuitry 750 (e.g., when the proxy 510 is provisioned within the ME circuitry 750 by a remote provisioning service). In some embodiments, the ME OS may include firmware modules for signing and verifying certificates using a certificate signing key pair. The firmware modules may verify a digital signature of certificates using a public key of the certificate signing key pair, and the private key of the certificate signing key pair is used by the security assist server to sign the certificates. The private key of this key pair may be stored in a secure data store associated with a remote provisioning service, and the public key of the key pair may be maintained in ME memory 754 as a firmware image that cannot be changed or altered (e.g., as one of the keys). In some embodiments, the ME OS may be any suitable OS or firmware, such as a real-time OS (RTOS) and the like.

In embodiments, the ME circuitry 750 may operate in accordance with the International Organization for Standardization (ISO) and International Electrotechnical Commission (IEC) specification ISO/IEC 11889:2009, which defines standards for trusted computing platforms. In embodiments, the ME circuitry may be a management engine provided by Intel®, a Converged Security Engine (CSE) or a Converged Security Management/Manageability Engine (CSME) provided by Intel®; Trusted Execution Technology (TXT) provided by Intel®; and/or the like. In some embodiments, the ME circuitry may operate in conjunction with Active Management Technology (AMT) provided by Intel® and/or Intel® vPro™ Technology (vPro). The Intel® AMT and/or Intel® vPro™ may allow for remote provisioning of the ME circuitry 750, and remote management of the ME circuitry once the ME circuitry has been successfully provisioned.

While not shown, various input/output (I/O) devices may be present within, or connected to, the computing platform 704. For example, a display may be included to show information, such as sensor readings or actuator position. An input device, such as a touch screen or keypad may be included to accept input. In another example, near-field communication (NFC) circuitry comprising an NFC controller coupled with an antenna element and a processing device may be included to read electronic tags and/or connect with another NFC-enabled device.

A battery 724 may power the computing platform 704, although in examples in which the computing platform 704 is mounted in a fixed location, it may have a power supply coupled to an electrical grid. The battery 724 may be a lithium ion battery, a metal-air battery, such as a zinc-air battery, an aluminum-air battery, a lithium-air battery, and the like.

A battery monitor/charger 726 may be included in the computing platform 704 to track the state of charge (SoCh) of the battery 820. The battery monitor/charger 726 may be used to monitor other parameters of the battery 724 to provide failure predictions, such as the state of health (SoH) and the state of function (SoF) of the battery 724. The battery monitor/charger 726 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 726 may communicate the information on the battery 724 to the processor 702 over the bus 706. The battery monitor/charger 726 may also include an analog-to-digital (ADC) convertor that allows the processor 702 to directly monitor the voltage of the battery 826 or the current flow from the battery 724. The battery parameters may be used to determine actions that the computing platform 704 may perform, such as transmission frequency, mesh network operation, sensing frequency, and the like.

A power block 728, or other power supply coupled to a grid, may be coupled with the battery monitor/charger 726 to charge the battery 724. In some examples, the power block 728 may be replaced with a wireless power receiver to obtain the power wirelessly, for example, through a loop antenna in the computing platform 704. A wireless battery charging circuit, such as an LTC4020 chip from Linear Technologies of Milpitas, Calif., among others, may be included in the battery monitor/charger 726. The specific charging circuits chosen depend on the size of the battery 724, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The mass storage 708 may include a number of modules to implement the group creation functions described herein, as well as functionality of other embodiments discussed herein. Although shown as code blocks in the mass storage 708, it may be understood that any of the modules may be replaced with hardwired circuits, for example, built into an ASIC, FPGA, and the like. For one embodiment, at least one of processors 702 may be packaged together with memory having one or more CDI modules 734. For one embodiment, at least one of processors 702 may be packaged together with memory having aspects of CDI modules 734 and/or any one or more of the other modules discussed herein, to form a System in Package (SiP). For one embodiment, at least one of processors 702 may be integrated on the same die with memory having aspects of CDI modules 734 and/or any one or more of the other modules/components discussed herein. For one embodiment, at least one of processors 702 may be packaged together with memory having aspects of CDI modules 734 and/or any one or more of the other modules discussed herein, to form a System on Chip (SoC). In any of the aforementioned embodiments, the mass storage 708 may also include the SEE 715 and various enclaves 717 therein.

The CDI modules 734 may include the CDI modules discussed infra with regard to FIGS. 8-11, depending on whether computing platform 704 is used as server 504, server 506, DC 507, an IoT device and/or devices D1-DN. In one example, the platform 704 may be implemented in a server 504, and the storage 708 may include CDI modules 734, which may be the earlier described CDI modules for server 504 and/or the modules discussed with regard to FIG. 8. In another example, the platform 704 may be implemented in a server 506, and the storage 708 may include CDI modules 734, which may be the earlier described CDI modules for server 506 and/or the modules discussed with regard to FIG. 9. In another example, the platform 704 may be implemented in a DC 507, and the storage 708 may include CDI modules 734, which may be the earlier described CDI modules for the DC 507 and/or the modules discussed with regard to FIG. 10. In another example, the platform 704 may be implemented in an IoT device and/or devices D1-DN, and the mass storage 708 may include the various modules discussed with regard to FIG. 11.

FIGS. 8-11 illustrate examples of computer-readable non-transitory storage media that may be suitable for use to store instructions that cause an apparatus, in response to execution of the instructions by the apparatus, to practice selected aspects of the present disclosure. The non-transitory computer-readable storage media may include a number of programming instructions that may be configured to enable a computer system/device (e.g., computer platform 704), in response to execution of the programming instructions, to implement (aspects of) various CDI modules 734 discussed previously. In alternate embodiments, the programming instructions may be disposed on multiple computer-readable non-transitory storage media instead. In still other embodiments, the programming instructions may be disposed on computer-readable transitory storage media, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The computer program code for carrying out operations of the present disclosure may also be written in any combination of the programming languages discussed herein. The program code may execute entirely on the user's wearable device, partly on the user's wearable device, as a stand-alone software package, partly on the user's wearable device and partly on a remote computer or entirely on the remote computer or server. In the latter scenario, the remote computer may be connected to the user's wearable device through any type of network, including a local area network (LAN) or a wide area network (WAN), or the connection may be made to an external computer (for example, through the Internet using an Internet Service Provider).

Figure 8:
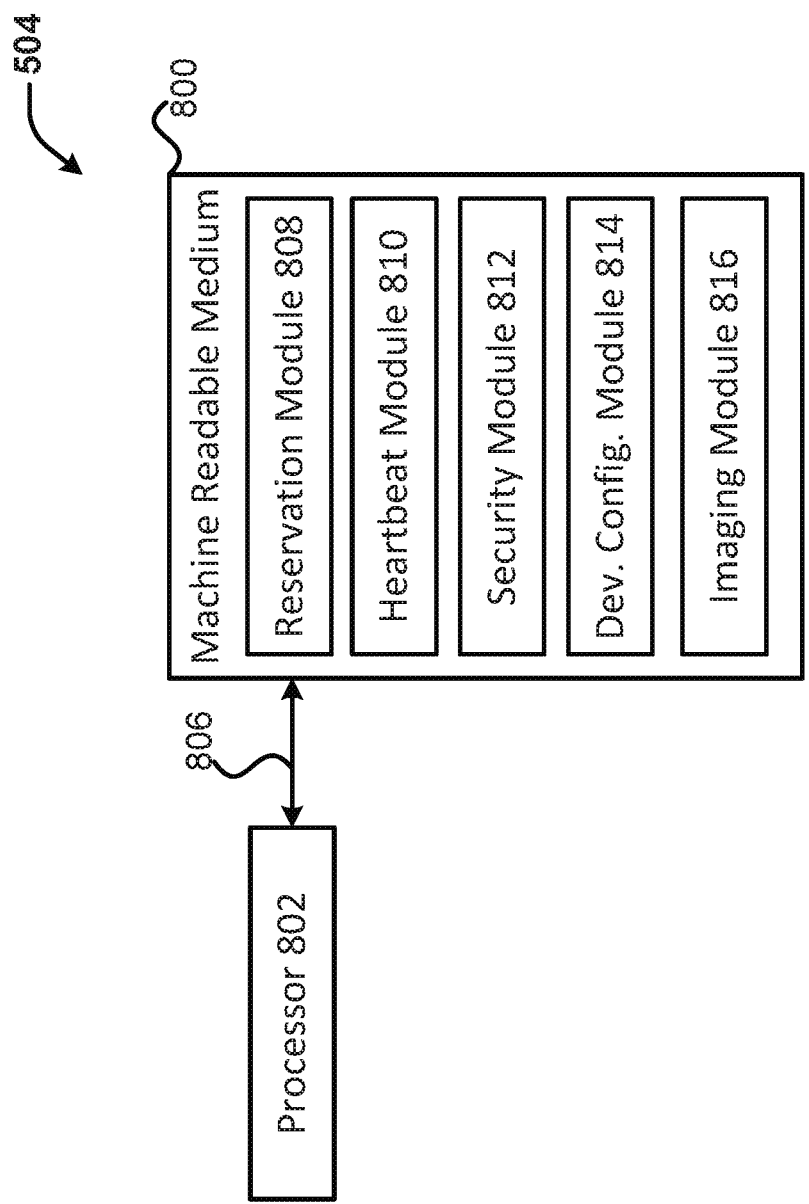
FIGS. 8-11 illustrate examples of computer-readable non-transitory storage media that may be suitable for use to store instructions that cause an apparatus, in response to execution of the instructions by the apparatus, to practice selected aspects of the present disclosure.

FIG. 8 is a block diagram of a non-transitory, machine readable medium 800 including code to direct a processor 802 to perform various functions delineated by the embodiments discussed herein. In embodiments, the non-transitory, machine readable medium 800 may be implemented in a server 504 that hosts a BLL. The processor 802 may access the non-transitory, machine readable medium 800 over a bus 806. The processor 802 and bus 806 may be selected as described with respect to the processor 702 and bus 706 of FIG. 7. The non-transitory, machine readable medium 800 may include devices described for the mass storage 708 of FIG. 7 or may include optical disks, thumb drives, or any number of other hardware devices.

The non-transitory, machine readable medium 800 may include code of reservation module 808 to direct the processor 802 to check for existing or available resources provided by one or more devices D1-DN reserve/schedule available resources for use; remove resources from availability to reduce resource oversubscription and/or overload scenarios; schedule/reserve resources or services for future use; and/or other like functions, for example, as described with respect to FIGS. 5-6. In embodiments, the processor 802 may operate the reservation module 808 to identify resources provided by devices D1-DN; query a DMS 506 for available devices D1-DN that provide the resources by controlling interface circuitry of the BLL server 504 to generate and transmit one or more REST messages or other like messages including the query for available devices D1-DN; receive reservation information indicating reserved resources of available devices D1-DN; and reserve the available resources of the identified resources for users based on reservation requests submitted by the users (e.g., using client device 501).

The non-transitory, machine readable medium 800 may include code of heartbeat module 810 to direct the processor 802 to identify HSI indicating whether resources provided by the DUTs are still available (e.g., off-line or on-line); and indicate, to the reservation module 808, state changes of the resources provided by the DUTs and/or device D1-DN, mode of operation changes based on the HSI. In embodiments, the HSI may be obtained from a heartbeat module of a DMS 506 (see e.g., FIG. 9 infra).

The non-transitory, machine readable medium 800 may include code of a security module 812 to direct the processor 802 to give access to the tools, resources, or pools of hardware resources on a per-user, per-group, or per-connecting system basis. In embodiments, the processor 802 may operate the security module 812 to provide access to the resources via the CDI portal 502, to receive reservation requests through the CDI portal 502, and to transmit reservation information through the CDI portal 502. The reservation requests and reservation information may be communicated using one or more REST messages or other like messages.

The non-transitory, machine readable medium 800 may include code of a device configuration module 814 to direct the processor 802 to register, view, and/or alter device metadata and associated device hardware. In embodiments, the processor 802 may operate the device configuration module 814 to obtain metadata for provisioning of a VM or container for accessing resources provided by the devices D1-DN; and to control interface circuitry to receive the metadata from a metadata repository 523 in one or more REST messages or other like messages, and generate and transmit one or more REST messages or other like messages including the metadata to the DMS 506.

The non-transitory, machine readable medium 800 may include code of an imaging module 816 to direct the processor 802 to define or alter the location, name, and/or attributes of a container (such as a Docker Container) or VM to be used for providing device or computing resources. In embodiments, the processor 802 may operate the imaging module 816 to obtain a VM/container image to be used for provisioning the VM/container, for example, from the artifactory 524. The VM/container image may be obtained in or with one or more REST messages or other like messages. The VM/container image may indicate a location for provisioning the VM/container, a name of the VM/container, and various attributes of the VM/container. The processor 802 may operate the imaging module 816 to alter or change the location, name, and various attributes of the VM/container image for provisioning.

Figure 9:
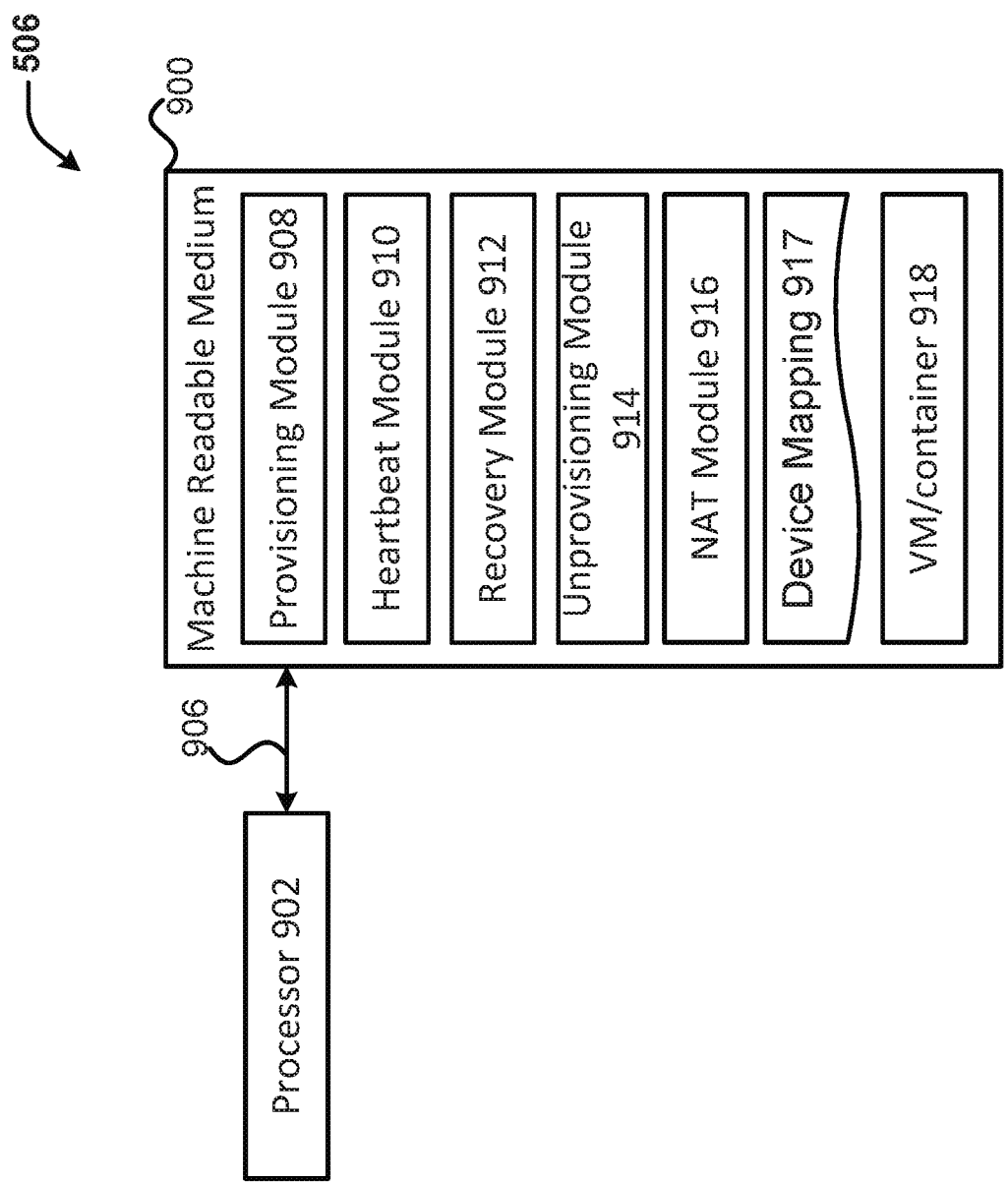

FIG. 9 is a block diagram of a non-transitory, machine readable medium 900 including code to direct a processor 902 to perform various functions delineated by the embodiments discussed herein. In embodiments, the non-transitory, machine readable medium 900 may be implemented in a DMS 506. The processor 902 may access the non-transitory, machine readable medium 900 over a bus 906. The processor 902 and bus 906 may be selected as described with respect to the processor 702 and bus 706 of FIG. 7. The non-transitory, machine readable medium 900 may include devices described for the mass storage 708 of FIG. 7 or may include optical disks, thumb drives, or any number of other hardware devices.

The non-transitory, machine readable medium 900 may include code of a provisioning module 908 to direct the processor 902 to create service coupling between the user of the resource(s) and the resource(s); check hardware availability and state (e.g., based on HSI); cleanup last provision request state if needed; create the semi-permanent service coupling; apply commands and security permissions against the assets and return final provision status, state, and metadata to the BLL 504; and the like. In embodiments, the processor 902 may operate the provisioning module 908 to identify a query for available devices D1-DN that provide resources of a pool of resources, which may be obtained from the BLL 504; identify the available computer devices via communication with one or more DCs 507 that are communicatively coupled with a corresponding subset of the devices D1-DN; and provision a VM 918 or container 918 to access the resources provided by the available devices D1-DN. The provisioning module 908 may provision the VM/container 918 using a VM image or container image obtained from the BLL 504. The provisioning module 908 may control interface circuitry of the DMS 506 to generate transmit/receive one or more REST messages or other like messages to/from the DCs 507 and BLL 504 to perform such functions.

The non-transitory, machine readable medium 900 may include code of a heartbeat module 910 to direct the processor 902 to monitor the state of the devices D1-DN. and report state changes to higher layer entities. In embodiments, the processor 902 may operate the heartbeat module 910 to monitor a plurality of devices D1-DN and generate a report indicating a state change of a one or more of the devices D1-DN when the devices D1-DN changes a mode of operation. This state change may be the HSI discussed previously, and the report including the HSI may be communicated to the BLL 504 in one or more REST messages or other like messages.

The non-transitory, machine readable medium 900 may include code of a recovery module 912 to direct the processor 902 to detect the state of the hardware and attempt to recover the hardware by means of power cycling the hardware, change the state of the hardware from one mode to another, etc. In embodiments, the processor 902 may operate the recovery module 912 to detect a state change of one or more devices D1-DN, and attempt recovery of the devices D1-DN by power cycling or adjusting the mode of operation of the devices D1-DN.

The non-transitory, machine readable medium 900 may include code of an unprovisioning module 914 to direct the processor 902 to remove the service coupling between the user of the resource. In embodiments, the processor 902 may operate the unprovisioning module to unprovision the VM/container 918 by removing a service coupling between the user of the resource (e.g., client 501) and the resource.

The non-transitory, machine readable medium 900 may include code of a NAT module 916 to direct the processor 902 to perform translate messages obtained from the BLL 504 for communication with various devices D1-DN using connections indicated by the device mapping 917. In embodiments, the processor 902 may operate the NAT module 916 to perform parameter, schema, language conversion; port forwarding or mapping; network address translation; packet routing; bridging; and/or other like functions.

The non-transitory, machine readable medium 900 may include code of VM/container 918 to direct the processor 902 to access resources provided by one or more devices D1-DN. In embodiments, the processor 902 may operate the VM/container 918 to execute one or more applications within the VM/container 918 environment to control the devices D1-DN to perform various functions.

Figure 10:
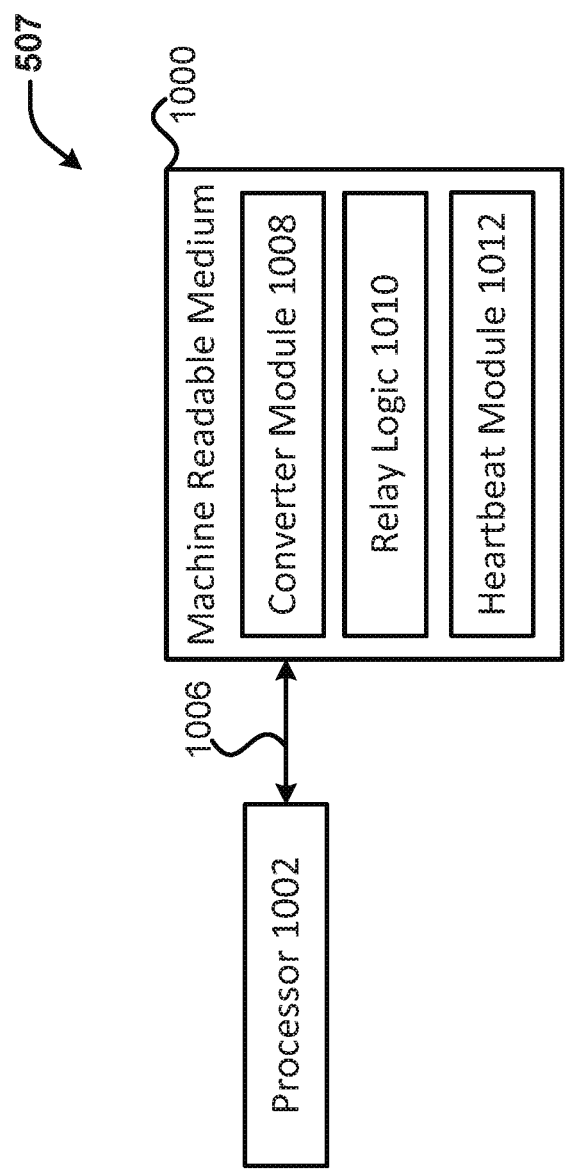

FIG. 10 is a block diagram of a non-transitory, machine readable medium 1000 including code to direct a processor 1002 to perform various functions delineated by the embodiments discussed herein. In embodiments, the non-transitory, machine readable medium 1000 may be implemented in a DC 507. The processor 1002 may access the non-transitory, machine readable medium 1000 over a bus 1006. The processor 1002 and bus 1006 may be selected as described with respect to the processor 702 and bus 706 of FIG. 7. The non-transitory, machine readable medium 1000 may include devices described for the mass storage 708 of FIG. 7 or may include optical disks, thumb drives, or any number of other hardware devices.

The non-transitory, machine readable medium 1000 may include code of a converter module 1008 to direct the processor 1002 to convert messages, parameters, commands, etc. obtained from higher layers (e.g., DMS 506) into messages, parameters, commands, etc. that may be consumed by IoT devices and/or devices D1-DN, connected to the DC 507; and to direct the processor 1002 to convert messages, parameters, commands, etc. obtained from lower layers (e.g., IoT devices and/or devices D1-DN connected to the DC 507) into messages, parameters, commands, etc. that may be consumed by higher layer entities (e.g., DMS 506).

In embodiments, the processor 1002 may operate the converter module 1008 to obtain a first message from a higher layer entity (e.g. a VM/container 918 implemented by a DMS 506); extract one or more parameters in the first message, where the one or more parameters are in a first format; convert the one or more parameters from the first format to a second format for consumption by one or more devices D1-DN. In some embodiments, the first format may include any combination of high-level programming languages and/or schemas. For example, the first message may be a REST message format (e.g., one or more HTTP messages), including commands, parameters, control signals, etc. in a high-level programming language/schema, such as those discussed herein. In such embodiments, the second format may be a low-level programming language (e.g., raw binary, machine code, assembly language, etc.). For example, the second message may be an I2C protocol message (e.g., address frames and/or data frames) with commands, parameters, control signals, etc. in the I2C format. The second format may also be a message of some other protocol/standard discussed herein.

In embodiments, the processor 1002 may operate the converter module 1008 to obtain a first message from a lower layer entity (e.g., one or more IoT devices and/or one or more devices D1-DN); extract one or more parameters in the first message, where the one or more parameters are in a first format; convert the one or more parameters from the first format to a second format for consumption by a higher layer entity (e.g. a VM/container 918 implemented by a DMS 506). In some embodiments, the first format may be a low-level programming language (e.g., raw binary, machine code, assembly language, etc.). For example, the first message may be an I2C protocol message (e.g., address frames and/or data frames) with commands, parameters, control signals, etc. in the I2C format. The first format may also be a message of some other protocol/standard discussed herein. In such embodiments, the second format may include any combination of high-level programming languages and/or schemas. For example, the second message may be a REST message format (e.g., one or more HTTP messages), including commands, parameters, control signals, etc. in a high-level programming language/schema, such as those discussed herein.

The non-transitory, machine readable medium 1000 may include code of relay logic 1010 to direct the processor 1002 to send various commands to one or more devices D1-DN. to control the one or more devices D1-DN. In embodiments, the processor 1002 may operate the relay logic 1010 to obtain signaling or messages from the converter module 1008, and may control interface circuitry of the DC 507 to perform various I/O operations (e.g., GPIO) in accordance with the obtained signaling/messages. For example, if a resource request includes a test requiring a compute board connected to a stepper motor to rotate in a direction six times, pause for five seconds, rotate in the opposite direction three times, and then repeat the test 10,000 times, then the relay module 1010 may send the requisite I/O operations to one or more compute boards coupled with stepper motors to perform that test. In some embodiments, the processor 1002 may operate the relay logic 1010 to control communications circuitry 705 and/or NIC 716 of the DC 507 to perform the various I/O operations (e.g., via a wired network protocol or a wireless communications protocol) in accordance with the obtained signaling/messages. For example, if a resource request includes a test requiring a smartphone to increase its volume and then reboot, then the relay module 1010 may wirelessly transmit one or more messages to one or more smartphones using cellular, WiFi, BLE, etc. signaling depending on the functionality of the one or more smartphones.

The non-transitory, machine readable medium 1000 may include code of a heartbeat module 1010 to direct the processor 1002 to monitor the devices D1-DN for state changes (e.g., HSI) and report any detected state changes. In embodiments, the processor 1002 may operate the heartbeat module 1010 to monitor a plurality of devices D1-DN for HSI, and generate a report indicating the HSI of one or more of the devices D1-DN when the devices D1-DN changes a mode of operation. This state change may be the HSI discussed previously, and the report including the HSI may be communicated to the DMS 506 in one or more REST messages or other like messages. The HSI obtained from the plurality of devices D1-DN may be in a low-level language, raw data, etc.

Figure 11:
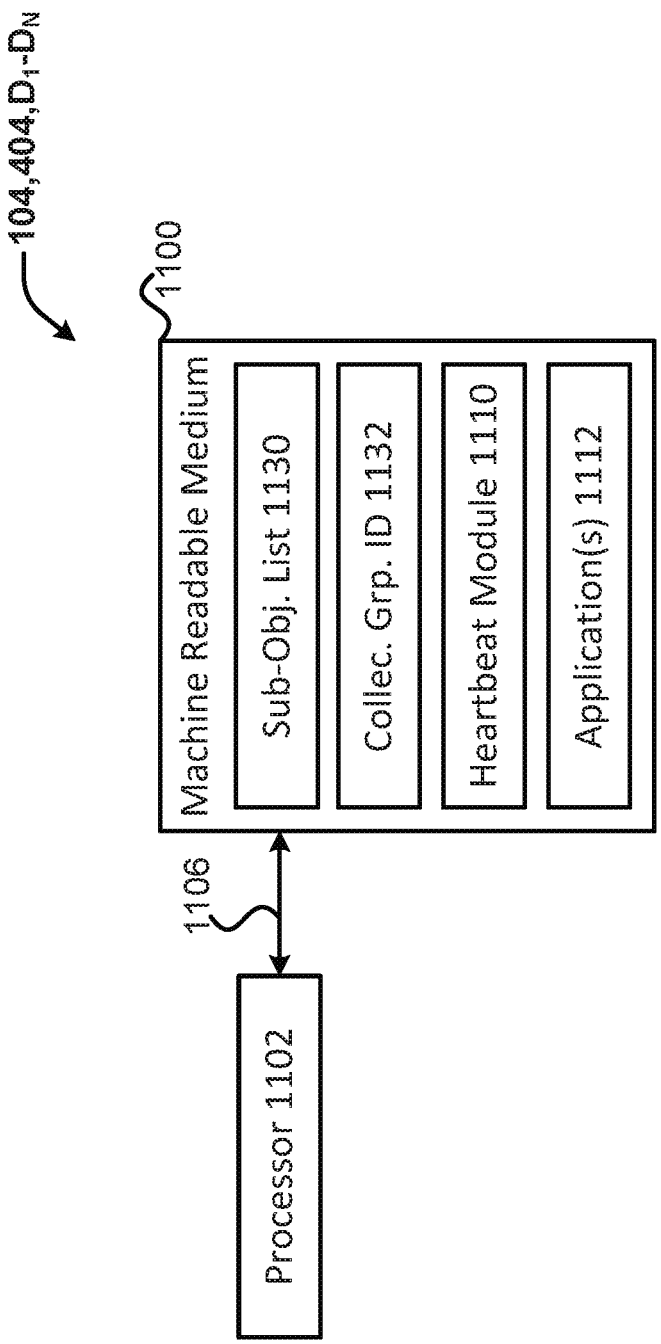

FIG. 11 is a block diagram of a non-transitory, machine readable medium 1100 including code to direct a processor 1102 to perform various functions delineated by the embodiments discussed herein. In embodiments, the non-transitory, machine readable medium 1100 may be implemented in an IoT devices (e.g., IoT devices 104, 404, etc.) and/or devices D1-DN. The processor 1102 may access the non-transitory, machine readable medium 1100 over a bus 1106. The processor 1102 and bus 1106 may be selected as described with respect to the processor 702 and bus 706 of FIG. 7. The non-transitory, machine readable medium 1100 may include devices described for the mass storage 708 of FIG. 7 or may include optical disks, thumb drives, UICCs, eUICCs, and/or any number of other hardware devices.

The non-transitory, machine readable medium 1100 may include code of reservation module 1108 to direct the processor 1102 to perform various functions for testing, experimentation, etc. as discussed previously with regard to FIGS. 5-6, as well as report hardware state information (HSI) to higher layer entities (e.g., DC 507). In embodiments, the processor 1102 may operate a sub-object list 1130 of atomic objects and composite objects that may be used to form a group object, such as for IoT group 306, fog device 402, and the like. In embodiments, the processor 1102 may operate the collection group identifiers (IDs) 1132, which may use the sub-object list 1130 to generate a group ID, for example, using a hash formula on the sub-object list 1130.

The non-transitory, machine readable medium 1100 may include code of heartbeat module 1110 to direct the processor 1102 to identify HSI indicating whether resources provided by the devices D1-DN are available (e.g., off-line or on-line); and indicate, to the reservation module 808, an availability of the resources provided by the devices D1-DN based on the HSI. In embodiments, the HSI may be reported to a heartbeat module of a DC 507 (see e.g., FIG. 10). The HSI may be reported by controlling the communications circuitry 705, NIC 716, and/or interface 718 depending on the type of device in which the non-transitory, machine readable medium 1100 is implemented.

The non-transitory, machine readable medium 800 may include code of one or more applications 1112 to direct the processor 1102 to perform various operations. In embodiments, the processor 1102 may operate the applications 1112 to perform general administration and operational functions of device, as well as the operations delineated by instructions/commands obtained from the DC 507. In some embodiments, the processor 1102 may operate the application(s) 1112 to control communications circuitry 705 and/or NIC 716 of the device to obtain a message including the commands/instructions (e.g., via a wired network protocol or a wireless communications protocol), and may also implement the same or a different application 1112 to perform the various I/O operations in accordance with the obtained signaling/messages.

FIGS. 12-15 illustrate processes 1200-1500, respectively, for providing the CDI technology of the present disclosure, according to various embodiments. For illustrative purposes, the operations of processes 1200-1500 are described as being performed by the various elements as described with respect to FIGS. 5-11 and/or between the various elements discussed with respect to FIGS. 5-11. It should be understood that such communications between the components/modules/devices may be facilitated by NICs, interfaces, and/or communications circuitry as described with regard to FIGS. 1-11 using the various messages/protocols discussed previously. Moreover, while particular examples and orders of operations are illustrated in FIGS. 12-15, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Figure 12:
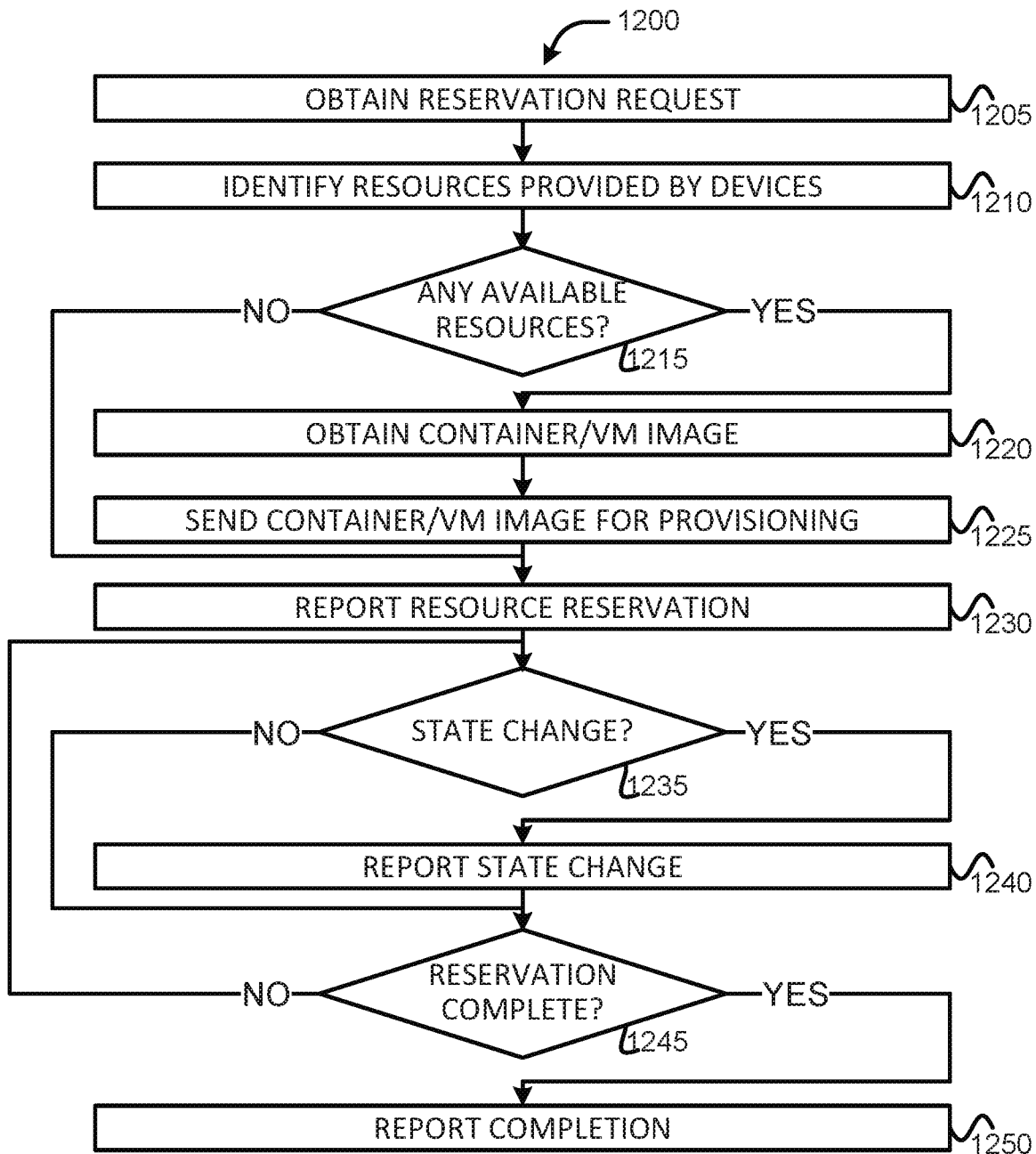
FIGS. 12-15 illustrate example processes for providing the CDI technology of the present disclosure, according to various embodiments.

Referring to FIG. 12, a flowchart illustrating an example process 1200 for implementing the BLL 504, in accordance with various embodiments, is shown. Process 1200 may begin at operation 1205 where processor circuitry of the BLL 504 may obtain a reservation request. This may include, for example, controlling interface circuitry (e.g., interface 718, NIC 716, and/or communications circuitry 705) to receive the reservation request from client 501 via CDI portal 502. In embodiments, the processor circuitry 802 may operate a security module 812 to obtain a reservation request from, for example, client 501 via CDI portal 502. The security module 812 may pass the reservation request to the reservation module 808. In other embodiments, the reservation request may be obtained from some other entity discussed previously.

At operation 1210, the processor circuitry 802 may operate the reservation module 808 to identify resources provided by one or more devices (e.g., IoT devices and/or Devices D1-DN). At operation 1215, the processor circuitry 802 may operate the reservation module 808 to determine whether any resources are available. This may include, for example, controlling interface circuitry (e.g., interface 718, NIC 716, and/or communications circuitry 705) to send a query for resources to one or more DMSes 506, and controlling the interface circuitry to obtain a reservation response with reservation information. The reservation module 808 may determine or identify the reserved resources from the reservation information.

If at operation 1215 the reservation module 808 determines that no resources are available, then the processor circuitry 802 may proceed to operation 1230 to report the resource reservation to the client 501 via the CDI portal 502. This resource reservation may indicate that no resources are available and/or may place the resource request in a queue for later processing.

If at operation 1215 the reservation module 808 determines that resources are available, then the processor circuitry 802 may proceed to operation 1220 to operate the imaging module 816 to obtain a container/VM image (e.g., from the artifactory 524), and at operation 1225, the processor circuitry 802 may operate the imaging module 816 to send the container/VM image (e.g., to one or more DMSes 506) for provisioning of a container/VM for controlling the resources. At operation 1230, the processor circuitry 802 may operate the reservation module 808 to send a reservation report to the client 501 via the CDI portal 502. This resource reservation may indicate the particular resources that are scheduled for the client 501 or requesting entity and/or when those resources may be utilized by the client 501 or requesting entity.

At operation 1235, the processor circuitry 802 may operate the heartbeat module 810 to determine whether a state change has occurred. This may include obtaining HSI in one or more messages (e.g., REST messages) from one or more DMSes 506 to which the container/VM has been provisioned. If at operation 1235 the heartbeat module 810 determines that a state change has not occurred, then the processor circuitry 802 may then proceed to operation 1245 to determine whether the reservation has been completed (discussed infra). If at operation 1235 the heartbeat module 810 determines that a state change has occurred, then the processor circuitry 802 may proceed to operation 1240 to operate the heartbeat module 810 to report the state change to, for example, the client 501 or the requesting entity.

At operation 1245, the processor circuitry 802 may operate the reservation module 808 to determine whether the reservation has been completed. If at operation 1245 the reservation module 808 determines that the reservation is not complete, the processor circuitry 802 may loop back to operation 1235 to detect whether a state change has occurred. If at operation 1245 the reservation module 808 determines that the reservation is complete, the processor circuitry 802 may proceed to operation 1250 to report completion of the reservation. In embodiments, the processor circuitry 802 may implement the reservation module 808 to report to the client 501 and/or requesting entity various results or data of various tests, experiments, etc. executed using the reserved resources, and/or report that the resources are no longer available for use. In embodiments, the processor circuitry 802 may implement the reservation module 808 to instruct the one or more DMSes 506 to unprovision the containers/VMs and/or otherwise make the used resources available for other clients 501 and/or requesting entities. After completion of operation 1250, the process 1200 may end or repeat as necessary.

In embodiments, during operations 1220 to 1250, the BLL 504 may be reading and/or receiving state information from the DMS 506 as the DMS 506 is handling a reservation (e.g., provisioning) through reservation completion (e.g., unprovisioning). The state information may indicate a status of the reservation, such as whether the provisioning was successfully completed; state changes of reported resources, whether the unprovisioning was successfully completed; and provisioning and/or unprovisioning failures.

In embodiments, operations 1235-1245 may be repeated a predefined number of time (e.g., 3 tries) or a predefined period of time (e.g., 5 minutes). If at operation 1245 the reservation has not been completed after the predefined number of times or within the predefined period of time, then the processor circuitry 802 may deem the reservation to have failed and may proceed to operation 1250 to report the reservation failure, which may indicate a reason for the failure.

Figure 13:
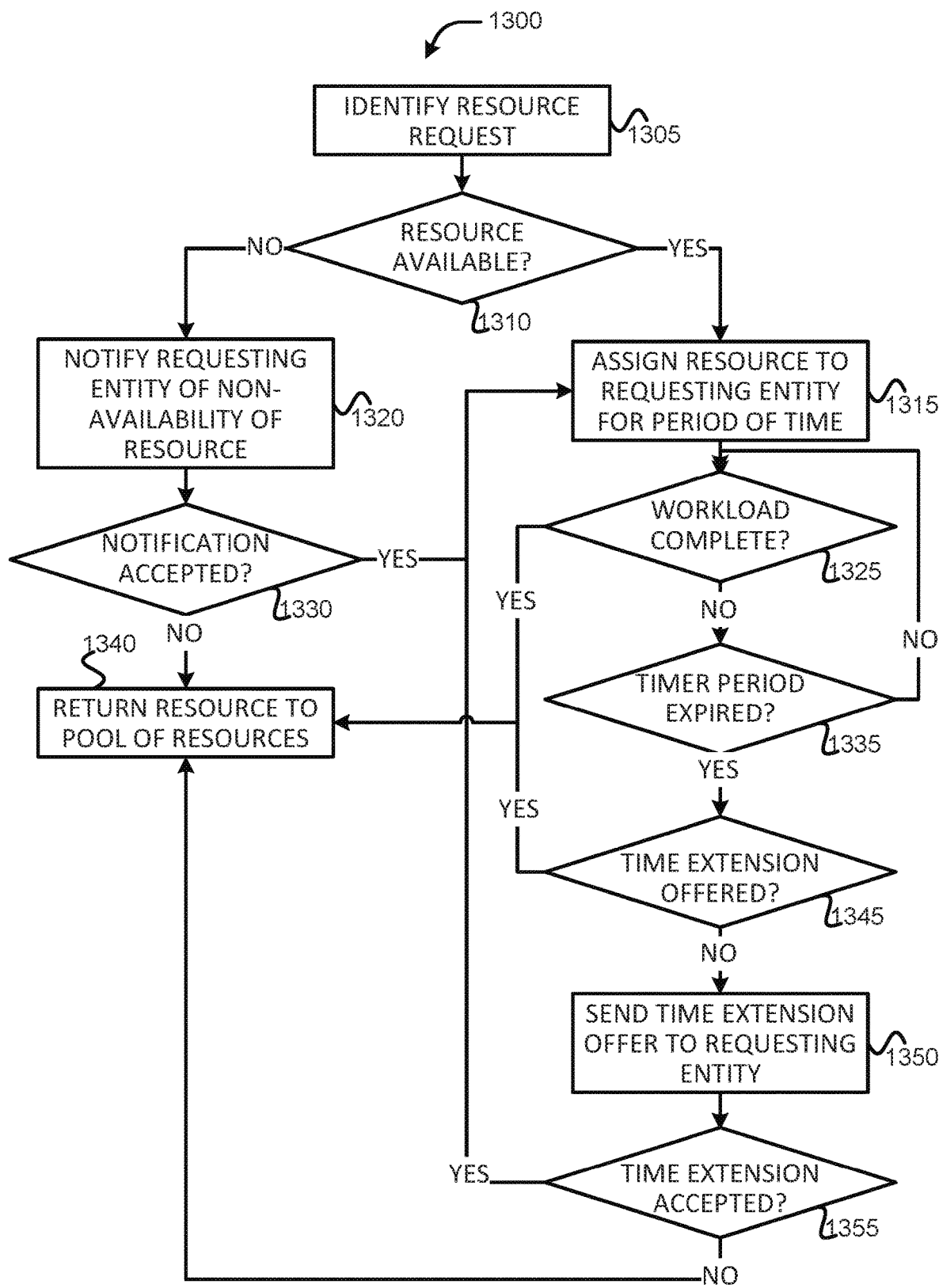

Referring to FIG. 13, a flowchart illustrating an example process 1300 for scheduling resources, in accordance with various embodiments, is shown. For operations of process 1300 that discuss communications taking place between the BLL 504 and other devices, the reservation module 808 may control interface circuitry of the BLL 504 (e.g., interface 718, NIC 716, and/or communications circuitry 705) to send/receive messages to/from such devices. Process 1300 may begin at operation 1305 where processor circuitry 802 of the BLL 504 may implement the reservation module 808 to identify requested resources, which may be based on a received reservation request. At operation 1310, the processor circuitry 802 may implement the reservation module 808 to determine if the identified resources are available.

If at operation 1310 the reservation module 808 determines that the resources are available, then the reservation module 808 may proceed to operation 1315 to assign the resources to the requesting entity for a period of time. At operation 1325, the reservation module 808 may determine whether the workload assigned to the resource has been completed. If at operation 1325 the reservation module 808 determines that the workload has been completed, then the reservation module 808 may proceed to operation 1340 to return the resource to a pool of resources. If at operation 1325 the reservation module 808 determines that the workload has not been completed, then the reservation module 808 may proceed to operation 1335 to determine whether the period of time has expired.

At operation 1335, the reservation module 808 may determine whether the period of time has expired. If at operation 1335 the reservation module 808 determines that the period of time has not expired, then the reservation module 808 may loop back to perform operation 1325. If at operation 1335 the reservation module 808 determines that the period of time has expired, then the reservation module 808 may proceed to operation 1345 to determine whether a time extension has been offered to the requesting entity.

If at operation 1345 the reservation module 808 determines that a time extension has been offered, then the reservation module 808 may proceed to operation 1340 to return the resource to a pool of resources. If at operation 1345 the reservation module 808 determines that a time extension has not been offered, then the reservation module 808 may proceed to operation 1350 to send a time extension offer to the requesting entity.

At operation 1355, the reservation module 808 may determine whether the time extension offer was accepted by the requesting entity. If at operation 1355 the reservation module 808 determines that the time extension offer was accepted, then the reservation module 808 may proceed back to operation 1315 to reassign the resource to the requesting entity for the period of time. If at operation 1355 the reservation module 808 determines that the time extension offer was not accepted, then the reservation module 808 may proceed to operation 1340 to return the resource to a pool of resources.

Referring back to operation 1310, if the reservation module 808 determines that the resources are not available, then the reservation module 808 may proceed to operation 1320 to notify the requesting entity that the requested resources are not available. In some embodiments, the reservation module 808 may send a notification indicating that the requested resources are not available, alternative resources that may be similar to the requested resource, an offer to reserve the resource at a later time and/or date, and/or may queue the request for later processing.

At operation 1330, the reservation module 808 may determine whether the notification was accepted by the requesting entity. If at operation 1330 the reservation module 808 determines that the notification was accepted, then the reservation module 808 may proceed to operation 1315 to assign a resource to the requesting entity according to the notification (e.g., at a later time/date, a similar alternative resource, etc.). If at operation 1330 the reservation module 808 determines that the notification was not accepted, then the reservation module 808 may proceed to operation 1340 to return the resource to a pool of resources. Process 1300 may repeat as necessary or end after completion of operation 1340.

Figure 14:
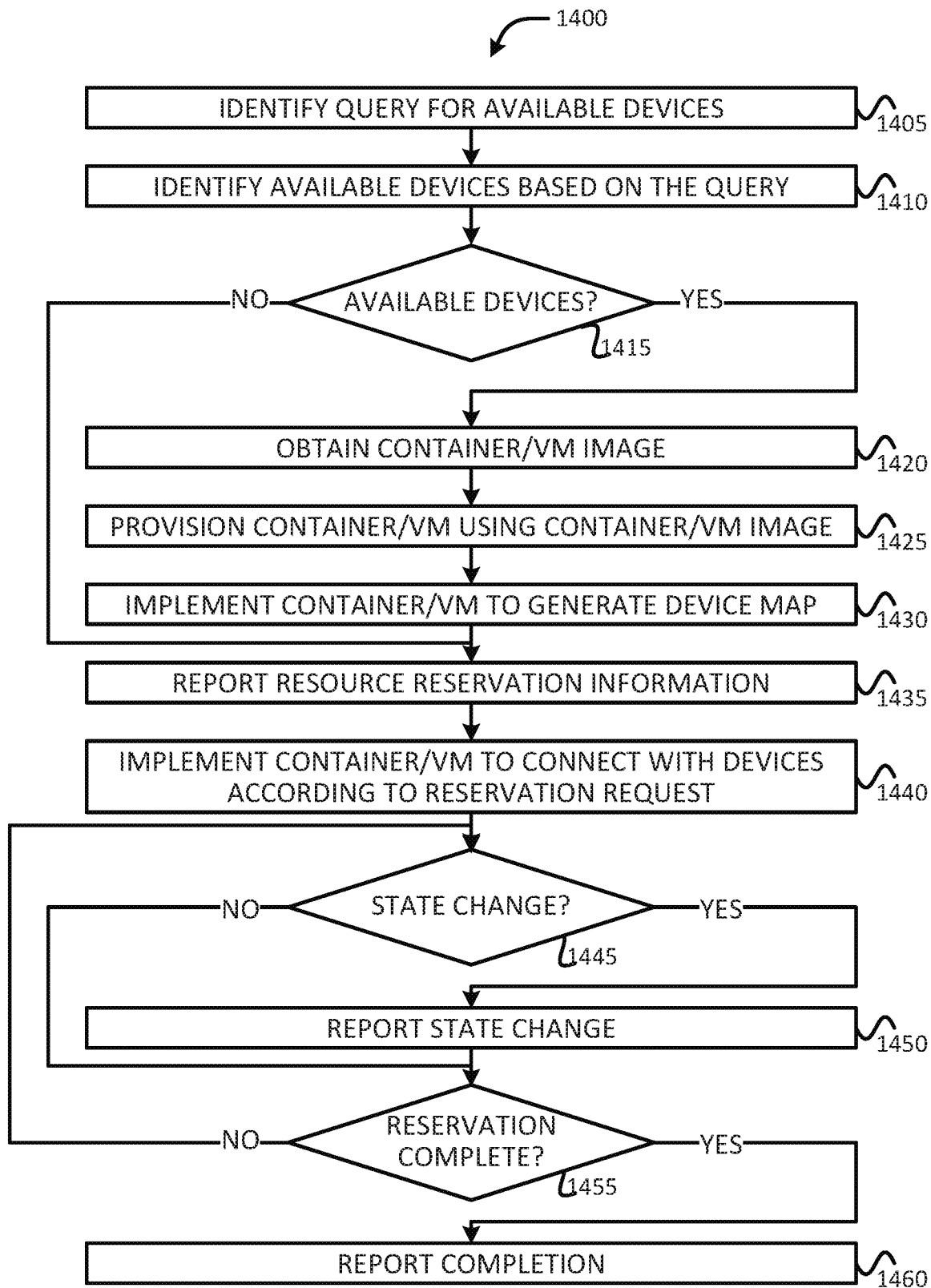

Referring to FIG. 14, a flowchart illustrating an example process 1400 for implementing the DMS 506, in accordance with various embodiments, is shown. For operations of process 1400 that discuss communications taking place between the DMS 506 and other devices, the DMS 506 (or modules therein) may control interface circuitry of the DMS 506 (e.g., interface 718, NIC 716, and/or communications circuitry 705) to send/receive messages to/from such devices. Process 1400 may begin at operation 1405 where processor circuitry 902 of the DMS 504 may implement provisioning module 908 to identify a query for available resources, which may be based on a resource request from the BLL 504. At operation 1410, the processor circuitry 902 may implement provisioning module 908 to identify available devices/resources based on the query.

At operation 1415, the processor circuitry 902 may implement provisioning module 908 to determine whether any connected devices/resources are available. If at operation 1415 the provisioning module 908 determines that no connected devices/resources are available, then the processor circuitry 902 may implement provisioning module 908 to proceed to operation 1435 to report resource reservation information. In this case, the resource reservation information may indicate that no devices/resources are available. If at operation 1415 the provisioning module 908 determines that one or more connected devices/resources are available, then the processor circuitry 902 may proceed to operation 1420 and implement provisioning module 908 to obtain a container/VM image.

At operation 1425, the processor circuitry 902 may implement provisioning module 908 to provision the container or VM using the obtained container/VM image. At operation 1430, the processor circuitry 902 may implement provisioning module 908 or implement/operate the container/VM 918 to generate a device map, which may indicate means for connecting to individual devices. After creation of the device map, at operation 1435, the processor circuitry 902 may implement provisioning module 908 to report resource reservation information to the BLL 504. In this case, the resource reservation information may indicate one or more reserved resources/devices, and the means for connecting with the reserved resources/devices.

At operation 1440, the processor circuitry 902 may implement the provisioned container/VM to connect with the devices/resources according to the reservation request. At operation 1445, the processor circuitry 902 may implement the heartbeat module 910 to detect a state change of the connected devices. If at operation 1445 the heartbeat module 910 detects a state change of a connected device, then the processor circuitry 902 may implement the heartbeat module 910 to report the state change to upper layers (e.g., a heartbeat module of the BLL 504) at operation 1450. Additionally or alternatively, when the state change indicates that an error or failure occurred at a connected device, then the processor circuitry 902 may implement a recovery module 912 to recover the failed device.

If at operation 1445 the heartbeat module 910 does not detect a state change, then the processor circuitry 902 may proceed to operation 1455 to implement the provisioning module 908 or the unprovisioning module 914 to determine whether the resource reservation is complete.

If at operation 1455 the provisioning module 908 or the unprovisioning module 914 determines that the resource reservation is not complete, then the processor 902 may proceed back to operation 1445 to monitor for state changes. If at operation 1455 the provisioning module 908 or the unprovisioning module 914 determines that the resource reservation is complete, then the processor 902 may proceed to operation 1460 and implement the provisioning module 908 or the unprovisioning module 914 to report the reservation completion. Additionally or alternatively, at or after operation 1460 the processor 902 may implement the unprovisioning module 914 to unprovision the VM/container 918. Process 1400 may repeat as necessary or end after completion of operation 1460.

Figure 15:
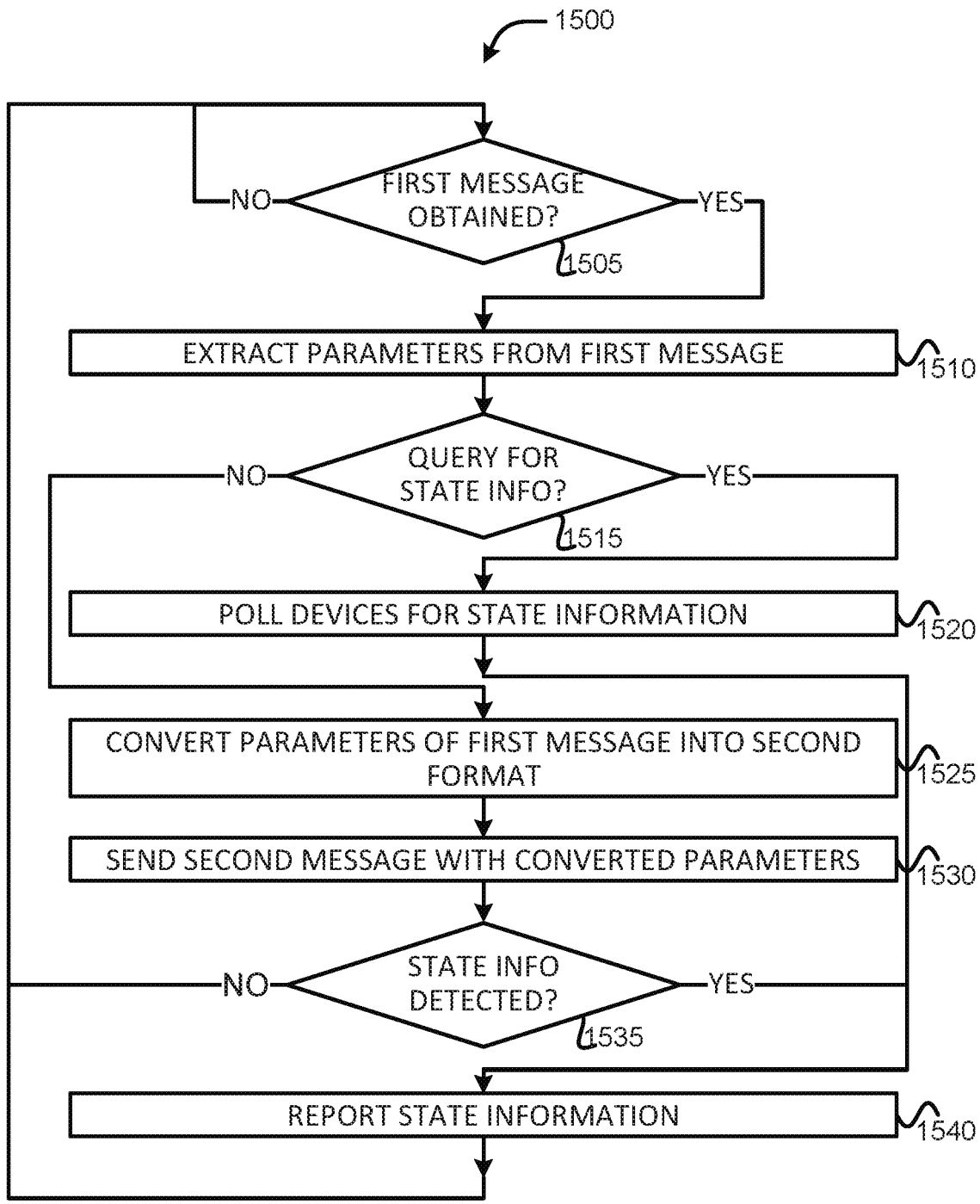

Referring to FIG. 15, a flowchart illustrating an example process 1500 for implementing the DC 507, in accordance with various embodiments, is shown. For operations of process 1500 that discuss communications taking place between the DC 507 and other devices, the DC 507 (or modules therein) may control interface circuitry of the DC 507 (e.g., interface 718, NIC 716, and/or communications circuitry 705) to send/receive messages to/from such devices.

Process 1500 may begin at operation 1505 where processor circuitry 1002 of the DC 507 may determine whether a first message has been obtained. In a first example, if the first message is obtained from higher layer entity (e.g., DMS 506), the first message may indicate I/O operations, commands, etc. to be relayed to one or more devices. In a second example, if the first message is obtained from a lower layer entity (e.g., a device D), the first message may indicate results of operations, tasks, actions of a workload and/or state information of the entity. If the first message has not been obtained at operation 1505, the processor circuitry 1002 may loop back to operation 1505 to monitor for the first message. If the first message has been obtained at operation 1505, the processor circuitry 1002 may proceed to operation 1510 to extract the parameters from the first message. At operation 1515 the processor circuitry 1002 may implement a heartbeat module 1012 to determine whether the extracted parameters indicate a query for HSI.

If at operation 1515 the heartbeat module 1012 determines that the extracted parameters do indicate a query for state information (e.g., hardware state information (HIS)), then the heartbeat module 1012 may proceed to operation 1520 to poll connected devices for the state information. The heartbeat module 1012 may then proceed to operation 1540 to report the state information. If at operation 1515 the heartbeat module 1012 determines that the extracted parameters do not indicate a query for state information, then the processor 1002 may proceed to operation 1525 to implement the converter module 1008 to convert the parameters of the first message into a second format In the first example, the second format may be a format that is compatible with the connected devices. In this case the parameters may indicate I/O operations, commands, etc. to be relayed to one or more devices, which may be in a first format that is not executable or is otherwise incompatible with the devices. At operation 1530, the processor 1002 may implement the relay module 1010 to send a second message including the parameters in the second format to the one or more devices. The relay module 1010 may also identify the intended recipient devices based on address or other identification information the first message, or using stored address/identification information.

In the second example, the second format may be a format that is compatible with the higher layer entities (e.g., the DMS 506). In this case the parameters may indicate results of operations, tasks, actions of a workload and/or state information to be relayed to the higher layer entity, which may be in a first format that is not executable or is otherwise incompatible with the higher layer entity. At operation 1530, the processor 1002 may implement the relay module 1010 to send a second message including the parameters in the second format to the higher layer entity. The relay module 1010 may also identify the intended recipient entity based on address or other identification information the first message, or using stored address/identification information.

At operation 1535, the processor circuitry 1002 may implement the heartbeat module 1012 to determine if state information is detected or obtained from one or more connected devices. If at operation 1535 the heartbeat module 1012 determines that state information has been detected, then the heartbeat module 1012 may then proceed to operation 1540 to report the detected state information. If at operation 1535 the heartbeat module 1012 determines that state information has not been detected, then the processor circuitry 1002 may proceed back to operation 1505 to monitor for a first message. In some embodiments, operations 1535-1540 may operate simultaneously as operations 1505-1530, or may operate as a background process. Process 1500 may repeat as necessary or end after completion of operation 1540.

Some non-limiting examples are as follows.

Example 1 may include an apparatus to be implemented in a server to host a business logic layer, "BLL", in a consolidated device infrastructure, "CDI", system, the apparatus comprising: processor circuitry to operate a reservation module to identify resources, and reserve available resources of the identified resources for a client based on a reservation request submitted by the client; and interface circuitry coupled with the processor circuitry, the interface circuitry to obtain, via a CDI portal of the CDI system, a representational state transfer, "REST", message including the reservation request, wherein the CDI portal is to provide user interfaces for submission of the resource request and interfaces to facilitate access to the reserved resources via a common service bus of the CDI system.

Example 2 may include the apparatus of example 1 and/or some other example herein, wherein the REST message is a first REST message, and wherein the processor circuitry is to: operate the reservation module to query a data management server, "DMS", for available devices that provide the resources, wherein, to query the DMS for available devices, the reservation module is to control the interface circuitry to: generate a second REST message including the query, and transmit the second REST message to the DMS; and operate a device configuration module to obtain metadata for provisioning of a docker container for accessing resources provided by the devices, wherein, to obtain the metadata, the device configuration module is to control the interface circuitry to: receive, from a metadata repository, the metadata in a third REST message, generate a fourth REST message including the metadata, and transmit the fourth REST message to the DMS.

Example 3 may include the apparatus of example 2 and/or some other example herein, wherein: the processor circuitry is to operate a heartbeat module to: identify hardware state information, "HSI", indicating a state change of the available devices, and indicate, to the reservation module, an availability of the resources provided by the available devices based on the HSI; and the interface circuitry is to receive the HSI in fifth REST messages from the DMS.

Example 4 may include the apparatus of example 2 and/or some other example herein, wherein the processor circuitry is to operate an imaging module to: obtain a docker container image to be used for provisioning the docker container, the docker container image indicating a location for provisioning the docker container, a name of the docker container, and attributes of the docker container, and wherein the fourth REST message is to further include the docker container image.

Example 5 may include the apparatus of any one of examples 1-4 and/or some other example herein, wherein the processor circuitry is to: operate a security module to provide access to the resources via the CDI portal, wherein the security module is to obtain the reservation request through the CDI portal.

Example 6 may include one or more computer-readable media, "CRM", including instructions, which when executed by a business logic layer, "BLL", in a consolidated device infrastructure, "CDI", system, causes the BLL to: obtain, via a CDI portal of the CDI system, a message including a reservation request for available resources, wherein the CDI portal is to provide a user interface for submission of the resource request; identify available resources in response to receipt of the resource request; reserve available resources of the identified resources for a client based on a reservation request submitted by the client; and provide access to the reserved resources via a common service bus of the CDI system, and wherein the CDI portal is to provide a user interface to facilitate access to the reserved resources via the common service bus.

Example 7 may include the CRM of example 6 and/or some other example herein, wherein the message is a first message, and wherein, the BLL, in response to execution of the instructions, is to: generate a second message including a query for available devices that provide the resources; control transmission of the second message to a data management server, "DMS"; control receipt, from a metadata repository, of metadata in a third message, wherein the metadata is for provisioning of a docker container, the docker container for accessing resources provided by the devices; generate a fourth message including the metadata, and control transmission of the fourth message to the DMS.

Example 8 may include the CRM of example 7 and/or some other example herein, wherein, the BLL, in response to execution of the instructions, is to: control receipt, from the DMS, of hardware state information, "HSI", indicating a state change of the devices that provide resources; indicate an availability of the resources based on the HIS.

Example 9 may include the CRM of example 7 and/or some other example herein, wherein, the BLL, in response to execution of the instructions, is to: obtain a docker container image to be used for provisioning the docker container, the docker container image indicating a location for provisioning the docker container, a name of the docker container, and attributes of the docker container, and wherein the fourth message is to further include the docker container image.

Example 10 may include the CRM of any of examples 6-9 and/or some other example herein, wherein each of the first message, the second message, the third message, the fourth message, and a message including the HSI comprise representational state transfer messages, Rich Site Summary services messages, Message Queue Telemetry Transport messages, or publish-subscription type messages.

Example 11 may include an apparatus to implement a business logic layer, "BLL", in a consolidated device infrastructure, "CDI", system, the apparatus comprising: reservation means for identifying resources, and reserving available resources of the identified resources for a client based on a reservation request submitted by the client; and communications means for receiving, via a CDI portal of the CDI system, a message including the reservation request, wherein the CDI portal is to provide user interfaces for submission of the resource request and interfaces to facilitate access to the reserved resources via a common service bus of the CDI system.

Example 12 may include the apparatus of example 11 and/or some other example herein, wherein the message is a first message, and the apparatus further comprises: device configuration means for obtaining metadata to provision container means for accessing resources provided by available devices that provide the resources; wherein the reservation means is for querying data management means for the available devices that provide the resources; and wherein the communications means is further for: transmitting, to the device management means, a second message including the query, receiving, from metadata storage means, the metadata in a third message, and transmitting, to the device management means, a fourth message including the metadata.

Example 13 may include the apparatus of example 12 and/or some other example herein, further comprising: heartbeat monitoring means for: identifying hardware state information, "HSI", indicating a state change of the available devices, and indicating, to the reservation means, an availability of the resources provided by the available devices based on the HSI; and wherein the communications means is for receiving the HSI in fifth messages from the device management means.

Example 14 may include the apparatus of example 12 and/or some other example herein, further comprising: imaging means for obtaining an image of the container means to be used for provisioning the container means, the image indicating a location for provisioning the container means, a name of the container means, and attributes of the container means, and wherein the fourth message is to further include the image.

Example 15 may include the apparatus of any one of examples 11-14 and/or some other example herein, further comprising: security means for providing access to the resources via the CDI portal, and for obtaining the reservation request through the CDI portal.

Example 16 may include a method to be performed by a server hosting a business logic layer, "BLL", in a consolidated device infrastructure, "CDI", system, the method comprising: obtaining, by the server via a CDI portal of the CDI system, a representational state transfer, "REST", message including a reservation request for available resources, wherein the CDI portal is to provide a user interface for submission of the resource request; identifying, by the server, available resources in response to receipt of the resource request; reserving, by the server, available resources of the identified resources for a client based on a reservation request submitted by the client; and providing, by the server, access to the reserved resources via a common service bus of the CDI system, and wherein the CDI portal is to provide a user interface to facilitate access to the reserved resources via the common service bus.

Example 17 may include the method of example 16 and/or some other example herein, wherein the REST message is a first REST message, and the method comprises: generating, by the server, a second REST message including a query for available devices that provide the resources; transmitting, by the server, the second REST message to a data management server, "DMS"; receiving, by the server from a metadata repository, metadata in a third REST message, wherein the metadata is for provisioning of a docker container, the docker container for accessing resources provided by the devices; generating, by the server, a fourth REST message including the metadata, and transmitting, by the server, the fourth REST message to the DMS.

Example 18 may include the method of example 17 and/or some other example herein, further comprising: receiving, by the server from the DMS, hardware state information, "HSI", indicating a state change of the devices providing the resources; determining, by the server, a current availability of the resources provided by the devices based on the HIS; and indicating, by the server, the current availability of the resources via the CDI portal.

Example 19 may include the method of example 17 and/or some other example herein, further comprising: obtaining, by the server, a docker container image to be used for provisioning the docker container, the docker container image indicating a location for provisioning the docker container, a name of the docker container, and attributes of the docker container, and wherein the fourth REST message is to further include the docker container image.

Example 20 may include the method of examples 16-19 and/or some other example herein, further comprising: providing, by the server, access to the common service bus via the CDI portal and the docker container.

Example 21 may include an apparatus to be employed as a data management server, "DMS", in a consolidated device infrastructure, "CDI", system, the apparatus comprising: processor circuitry to operate a provisioning module to: identify a query for available devices that provide resources of a pool of resources, the available devices being among a plurality of devices, identify the available devices via communication with a plurality of device controllers, "DCs", the plurality of DCs being communicatively coupled with a corresponding subset of the plurality of devices, and provision a virtual machine, "VM", to access the resources provided by the available devices; and
    interface circuitry coupled with the processor circuitry, the interface circuitry to: receive a first representational state transfer, "REST", message including the query, and receive a second REST message including a VM image for provisioning the VM.

Example 22 may include the apparatus of example 21 and/or some other example herein, wherein the processor circuitry is to: operate the VM to generate a device map, the device map indicating physical locations of the plurality of devices to logical addresses of resources provided by the devices; and operate the VM to determine a service coupling between a requesting entity and resources indicated by the query.

Example 23 may include the apparatus of example 22 and/or some other example herein, wherein: the interface circuitry is to receive a third REST message; and the processor circuitry is to operate an unprovisioning module to remove the service coupling between a user of the resource and delete the VM in response to receipt of the third REST message.

Example 24 may include the apparatus of example 23 and/or some other example herein, wherein: the processor circuitry is to operate a heartbeat module to monitor the plurality of devices, and generate a report indicating a state change of a device of the plurality of devices when the device changes a mode of operation; and the interface circuitry is to generate and transmit a fourth REST message including the report.

Example 25 may include the apparatus of example 24 and/or some other example herein, wherein: the processor circuitry is to operate a recovery module to detect the state change of the device, and attempt recovery of the device by power cycling or adjusting the mode of operation.

Example 26 may include one or more computer-readable media, "CRM", including instructions, which when executed by a data management server, "DMS", in a consolidated device infrastructure, "CDI", system, causes the DMS to: control receipt of a first representational state transfer, "REST", message including a query, and identify, based on the query, available resources of a plurality of resources via communication with a plurality of device controllers, "DCs", the plurality of DCs being communicatively coupled with a corresponding subset of a plurality of devices that provide the plurality of resources; receive a second REST message including a VM image for provisioning the VM; and provision a virtual machine, "VM", to access the resources provided by the available devices.

Example 27 may include the CRM of example 26 and/or some other example herein, wherein, to provision the VM, the DMS, in response to execution of the instructions, is to: operate the VM to generate a device map, the device map indicating physical locations of the plurality of devices to logical addresses of resources provided by the devices; and operate the VM to determine a service coupling between a requesting entity and resources indicated by the query.

Example 28 may include the CRM of example 27 and/or some other example herein, wherein the DMS, in response to execution of the instructions, is to: remove the service coupling between a user of the resource; and delete the VM.

Example 29 may include the CRM of example 28 and/or some other example herein, wherein the DMS, in response to execution of the instructions, is to: detect a state change of a device of the plurality of devices; generate a report to indicate the state change, wherein the state change is to indicate that the device has changed a mode of operation; and control transmission of a fourth REST message including the report.

Example 30 may include the CRM of example 29 and/or some other example herein, wherein the DMS, in response to execution of the instructions, is to: attempt, in response to detection of the state change, recovery of the device by power cycling or adjusting the mode of operation.

Example 31 may include an apparatus to be employed as a data management server, "DMS", in a consolidated device infrastructure, "CDI", system, the apparatus comprising: provisioning means for: identifying a query for available devices that provide resources of a pool of resources, the available devices being among a plurality of devices, identifying the available devices via communication with a plurality of device control means, the plurality of device control means being communicatively coupled with a corresponding subset of the plurality of devices, and provisioning a container means, wherein the container means is for accessing the resources provided by the available devices; and communication means for receiving a first message including the query, and receiving a second message including container configuration information for provisioning the container means.

Example 32 may include the apparatus of example 31 and/or some other example herein, wherein the container means is for: generating a device map, the device map indicating physical locations of the plurality of devices to logical addresses of resources provided by the devices; and determining a service coupling between a requesting entity and resources indicated by the query.

Example 33 may include the apparatus of example 32 and/or some other example herein, wherein the communication means is for receiving a third message, and the apparatus comprises: unprovisioning means for removing the service coupling between a user of the resource and deleting the container means in response to receipt of the third message.

Example 34 may include the apparatus of example 33 and/or some other example herein, further comprising: heartbeat monitoring means for monitoring the plurality of devices, and generating a report indicating a state change of a device of the plurality of devices when the device changes a mode of operation; and wherein the communication means is for generating and transmitting a fourth message including the report.

Example 35 may include the apparatus of example 34 and/or some other example herein, further comprising: recovery means to detect the state change of the device based on the HSI, and attempting recovery of the device by power cycling or adjusting the mode of operation.

Example 36 may include a method to be performed by a data management server, "DMS", in a consolidated device infrastructure, "CDI", system, the method comprising: receiving, by the DMS, a first representational state transfer, "REST", message including a query, and identifying, by the DMS based on the query, available resources of a plurality of resources via communication with a plurality of device controllers, "DCs", the plurality of DCs being communicatively coupled with a corresponding subset of a plurality of devices that provide the plurality of resources; receiving, by the DMS, a second REST message including a VM image for provisioning the VM; and provisioning, by the DMS, a virtual machine, "VM", to access the resources provided by the available devices.

Example 37 may include the method of example 36 and/or some other example herein, wherein provision the VM comprises: operating, by the DMS, the VM to generate a device map, the device map indicating physical locations of the plurality of devices to logical addresses of resources provided by the devices; and operating, by the DMS, the VM to determine a service coupling between a requesting entity and resources indicated by the query.

Example 38 may include the method of example 37 and/or some other example herein, further comprising: receiving, by the DMS, a third REST message including an instruction to unprovision the VM; removing, by the DMS, the service coupling between a user of the resource; and deleting, by the DMS, the VM.

Example 39 may include the method of example 38 and/or some other example herein, further comprising: detecting, by the DMS, a state change of a device of the plurality of devices; generating, by the DMS, a report to indicate the state change, wherein the state change is to indicate that the device has changed a mode of operation; and transmitting, by the DMS, a fourth REST message including the report.

Example 40 may include the method of example 39 and/or some other example herein, further comprising: attempting, by the DMS in response to detection of the state change, recovery of the device by power cycling or adjusting the mode of operation.

Example 41 may include an apparatus to be implemented as a device controller, "DC", in a consolidated device infrastructure, "CDI", system, the apparatus comprising: interface circuitry to receive a first message including parameters in a first format, and transmit a second message including the parameters in a second format; and processor circuitry communicatively coupled with the interface circuitry, the processor circuitry to extract the parameters from the first message, and convert the parameters into the second format.

Example 42 may include the apparatus of example 41 and/or some other example herein, wherein the first devices comprise one or more device management servers, the second devices comprise one or more devices that provide resources in the CDI system, and the parameters comprise instructions for performing general purpose input/output operations according to the instructions indicated by the parameters.

Example 43 may include the apparatus of example 42 and/or some other example herein, wherein the first message comprises a representational state transfer, "REST", message, a Rich Site Summary services message, a Message Queue Telemetry Transport message, or a publish-subscription type message; and the first format comprises a high-level programming language or schema, and the second format comprises an I2C protocol format.

Example 44 may include the apparatus of example 41 and/or some other example herein, wherein the first devices comprise one or more devices that provide resources in the CDI system, the second devices comprise one or more device management servers, and the parameters comprise hardware state information indicating a state change of at least one of the one or more devices that provide resources.

Example 45 may include the apparatus of example 44 and/or some other example herein, wherein the first message comprises an I2C protocol message and the first format comprises a low-level programming language, and the second format comprises a high-level programming language or schema, and the second message comprises a REST message, a Rich Site Summary services message, a Message Queue Telemetry Transport message, or a publish-subscription type message.

Example 46 may include one or more computer-readable media, "CRM", including instructions, which when executed by a device controller, "DC" in a consolidated device infrastructure, "CDI", system, causes the DC to: control receipt of a first message from first devices that are communicatively coupled with the DC; extract parameters from the first message, wherein the parameters are in a first format; convert the parameters into a second format; and control transmission, to second devices that are communicatively coupled with the DC, of a second message including the parameters in the second message, the second devices being different than the first devices.

Example 47 may include the CRM of example 45 and/or some other example herein, wherein the first devices comprise one or more device management servers, the second devices comprise one or more devices that provide resources in the CDI system, and the parameters comprise instructions for performing general purpose input/output operations according to the instructions indicated by the parameters.

Example 48 may include the CRM of example 47 and/or some other example herein, wherein the first message comprises a representational state transfer, "REST", message, a Rich Site Summary services message, a Message Queue Telemetry Transport message, or a publish-subscription type message; and the first format comprises a high-level programming language or schema, and the second format comprises an I2C protocol format.

Example 49 may include the CRM of example 46 and/or some other example herein, wherein the first devices comprise one or more devices that provide resources in the CDI system, the second devices comprise one or more device management servers, and the parameters comprise hardware state information indicating a state change of at least one of the one or more devices that provide resources.

Example 50 may include the CRM of example 49 and/or some other example herein, wherein the first message comprises an I2C protocol message and the first format comprises a low-level programming language, and the second format comprises a high-level programming language or schema, and the second message comprises a REST message, a Rich Site Summary services message, a Message Queue Telemetry Transport message, or a publish-subscription type message.

Example 51 may include an apparatus to be implemented as a device controller, "DC", in a consolidated device infrastructure, "CDI", system, the apparatus comprising: communication means for receiving a first message including parameters in a first format, and transmitting a second message including the parameters in a second format; extraction means for extracting the parameters from the first message; and conversion means for converting the parameters into the second format.

Example 52 may include the apparatus of example 51 and/or some other example herein, wherein the first devices comprise one or more device management servers, the second devices comprise one or more devices that provide resources in the CDI system, and the parameters comprise instructions for performing general purpose input/output operations according to the instructions indicated by the parameters.

Example 53 may include the apparatus of example 52 and/or some other example herein, wherein the first message comprises a representational state transfer, "REST", message, a Rich Site Summary services message, a Message Queue Telemetry Transport message, or a publish-subscription type message; and the first format comprises a high-level programming language or schema, and the second format comprises an I2C protocol format.

Example 54 may include the apparatus of example 51 and/or some other example herein, wherein the first devices comprise one or more devices that provide resources in the CDI system, the second devices comprise one or more device management servers, and the parameters comprise hardware state information indicating a state change of at least one of the one or more devices that provide resources.

Example 55 may include the apparatus of example 54 and/or some other example herein, wherein the first message comprises an I2C protocol message and the first format comprises a low-level programming language, and the second format comprises a high-level programming language or schema, and the second message comprises a REST message, a Rich Site Summary services message, a Message Queue Telemetry Transport message, or a publish-subscription type message.

Example 56 may include a method to be performed by a device controller, "DC" in a consolidated device infrastructure, "CDI", system, the method comprising:

receiving, by the DC, a first message from first devices that are communicatively coupled with the DC; extracting, by the DC, parameters from the first message, wherein the parameters are in a first format; converting, by the DC, the parameters into a second format; and transmitting, by the DC to second devices that are communicatively coupled with the DC, a second message including the parameters in the second message, the second devices being different than the first devices.

Example 57 may include the method of example 56 and/or some other example herein, wherein the first devices comprise one or more device management servers, the second devices comprise one or more devices that provide resources in the CDI system, and the parameters comprise instructions for performing general purpose input/output operations according to the instructions indicated by the parameters.

Example 58 may include the method of example 57 and/or some other example herein, wherein the first message comprises a representational state transfer, "REST", message, a Rich Site Summary services message, a Message Queue Telemetry Transport message, or a publish-subscription type message; and the first format comprises a high-level programming language or schema, and the second format comprises an I2C protocol format.

Example 59 may include the method of example 56 and/or some other example herein, wherein the first devices comprise one or more devices that provide resources in the CDI system, the second devices comprise one or more device management servers, and the parameters comprise hardware state information indicating a state change of at least one of the one or more devices that provide resources.

Example 60 may include the method of example 59, wherein the first message comprises an I2C protocol message and the first format comprises a low-level programming language, and the second format comprises a high-level programming language or schema, and the second message comprises a REST message, a Rich Site Summary services message, a Message Queue Telemetry Transport message, or a publish-subscription type message.

Example 61 may include a consolidated device infrastructure, "CDI", system comprising: presentation means for providing a presentation tier of services, the presentation tier of services include facilitating access to a pool of resources provided by a plurality of devices deployed at a plurality of geographic locations via submission of resource requests through the CDI portal; business logic means for providing a logic tier of services, the logic tier of services include identifying available resources of the pool of resources and scheduling the identified available resources for use by one or more users; and data management means remotely and separately deployed at the plurality of geographic locations for providing a data tier of services and a hardware tier of services, the data tier of services and the hardware tier of services include providing access to the pool of resources provided by the plurality of devices.

Example 62 may include the CDI system of example 61 and/or some other example herein, further comprising device: device control means for converting commands obtained from the data management means into general-purpose input/output operations for utilizing resources provided by a plurality of devices that are communicatively coupled with the device control means.

Example 63 may include the CDI system of example 62 and/or some other example herein, wherein the data management means is for: receiving, from the business logic means, a query for available resources provided by the plurality of devices that are communicatively coupled with the device control means; determining available resources based on the query; transmitting, to the business logic means, an indication of the available resources; receiving, from the business logic means, selections of the indicated resources and associated metadata; and provisioning a container within the device management means using the metadata for accessing the selected resources.

Example 64 may include the CDI system of example 63 and/or some other example herein, wherein the data management means is for: transmitting, to the business logic means, logical addresses of the available resources based on a device map, wherein the presentation means is for displaying the logical addresses to in the presentation tier of services; and performing network address translation on logical addresses indicated by a resource request to obtain corresponding physical locations of the resources.

Example 65 may include the CDI system of examples 63-64 and/or some other example herein, wherein the data management means is for: unprovisioning the container after a time period for accessing the selected resources has elapsed.

Example 66 may include a consolidated device infrastructure, "CDI", system, comprising: a server to host a CDI portal to provide a presentation tier of services, the presentation tier of services include facilitating access to a pool of resources provided by a plurality of devices deployed at a plurality of geographic locations of an enterprise via submission of resource requests through the CDI portal from any location of the enterprise; a server to host a business logic layer, "BLL", to provide a logic tier of services, the logic tier of services include identifying available resources of the pool of resources and scheduling the identified available resources for use by one or more users; and a plurality of data management servers, "DMSes", remotely and separately deployed at the plurality of geographic locations to provide a data tier of services and a hardware tier of services, the data tier of services and the hardware tier of services include providing access to the pool of resources provided by the plurality of devices.

Example 67 may include the CDI system of example 66 and/or some other example herein, further comprising: a plurality of device controllers, "DCs" communicatively coupled with the plurality of DMSes, and each DC of the plurality of DCs is communicatively coupled with a corresponding subset of the plurality of devices, and wherein each DC is to convert commands obtained from the plurality of DMSes into general-purpose input/output operations for utilizing resources provided by the corresponding subset of the plurality of devices.

Example 68 may include the CDI system of example 67 and/or some other example herein, wherein individual DMSes of the plurality of DMSes are to: receive, from the server hosting the BLL, a query for available resources; identify available resources via communication with the plurality of DCs; transmit, to the server hosting the BLL, an indication of the determined resources; receive, from the server hosting the BLL, selections of the indicated resources and associated metadata; and provision one or more virtual machine, "VMs", using the metadata, wherein the one or more VMs include a mapping of physical locations of devices that provide the selected resources to logical addresses of selected resources.

Example 69 may include the CDI system of example 68 and/or some other example herein, wherein individual DMSes of the plurality of DMSes are to: transmit, to the server hosting the BLL, the logical addresses based on the mapping, the logical addresses to be displayed by the presentation tier of services; and perform network address translation on logical addresses indicated by a resource request to obtain corresponding physical locations of the devices that provide the resources.

Example 70 may include the CDI system of examples 66-69 and/or some other example herein, further comprising: an enterprise network and a plurality of local area networks to couple the server to host the BLL with the plurality of DMSes.

As will be appreciated by one skilled in the art, aspects of the present disclosure may be embodied as methods or computer program products. Accordingly, aspects of the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, aspects of the present disclosure may take the form of a computer program product embodied in any tangible or non-transitory medium of expression having computer-usable program code embodied in the medium.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus to be implemented in a server to host a business logic layer (BLL) in a consolidated device infrastructure (CDI) system, the apparatus comprising:
   processor circuitry to provide a logic tier of services, the logic tier of services includes identification of operation of a reservation module to:
      identify resources among a pool of resources provided by a plurality of devices deployed at a plurality of geographic locations of an enterprise, and
      schedule and reserve available resources of the identified resources for a client based on a reservation request submitted by the client; and
   interface circuitry coupled with the processor circuitry, the interface circuitry to:
      obtain, via a CDI portal of the CDI system, a representational state transfer (REST) message including the reservation request, wherein the CDI portal is to provide a presentation tier of services, the presentation tier of services includes user interfaces for submission of a resource request from any location of the enterprise and interfaces to facilitate access to the reserved resources via a common service bus of the CDI system,
   wherein a plurality of data management servers (DMSs) are remotely and separately deployed at the plurality of geographic locations, each of the plurality of DMSs is arranged to provide a data tier of services and a hardware tier of services, the data tier of services and the hardware tier of services includes providing access to the pool of resources provided by the plurality of devices; and
   wherein a plurality of device controllers (DCs) are communicatively coupled with the plurality of DMSs, each DC of the plurality of DCs is communicatively coupled with a corresponding subset of the plurality of devices, and each DC is arranged to convert commands obtained from the plurality of DMSs into general-purpose input/ output operations for utilizing resources provided by the corresponding subset of the plurality of devices.

2. The apparatus of claim 1, wherein the REST message is a first REST message, and wherein the processor circuitry is to:
operate the reservation module to query the DMS for available devices that provide the resources, wherein, to query the DMS for available devices, the reservation module is to control the interface circuitry to:
generate a second REST message including the query, and
transmit the second REST message to the DMS; and
operate a device configuration module to obtain metadata for provisioning of a docker container for accessing resources provided by the available devices, wherein, to obtain the metadata, the device configuration module is to control the interface circuitry to:
receive, from a metadata repository, the metadata in a third REST message,
generate a fourth REST message including the metadata, and
transmit the fourth REST message to the DMS.

3. The apparatus of claim 2, wherein:
the processor circuitry is to operate a heartbeat module to:
identify hardware state information (HSI) indicating a state change of the available devices, and
indicate, to the reservation module, an availability of the resources provided by the available devices based on the HSI; and
the interface circuitry is to receive the HSI in fifth REST messages from the DMS.

4. The apparatus of claim 2, wherein the processor circuitry is to operate an imaging module to:
obtain a docker container image to be used for provisioning the docker container, the docker container image indicating a location for provisioning the docker container, a name of the docker container, and attributes of the docker container, and
wherein the fourth REST message is to further include the docker container image.

5. The apparatus of claim 1, wherein the processor circuitry is to:
operate a security module to provide access to the resources via the CDI portal, wherein the security module is to obtain the reservation request through the CDI portal.

6. One or more non-transitory computer-readable media (NTCRM) including instructions, which when executed by a data management server (DMS) among a plurality of data management servers (DMSs) that are remotely and separately deployed at a plurality of geographic locations in a consolidated device infrastructure (CDI) system, is to cause the DMS to:
interact with one or more business logic layer (BLL) servers of the CDI that are configured to provide a logic tier of services, the logic tier of services include identification of available resources of a pool of resources and scheduling the identified available resources for use by one or more users; and
provide a data tier of services and a hardware tier of services, the data tier of services and the hardware tier of services includes providing access to a pool of resources provided by a plurality of devices, and providing access to a pool of resources comprises:
receive a first representational state transfer (REST) message including a query, and identify, based on the query, available resources of a plurality of resources via communication with a plurality of device controllers (DCs) communicatively coupled with the plurality of DMSs, each DC of the plurality of DCs being communicatively coupled with a corresponding subset of the plurality of devices that provide the plurality of resources, and each DC is arranged to convert commands obtained from the plurality of DMSs into general-purpose input/output operations for utilizing resources provided by the corresponding subset of the plurality of devices;
receive a second REST message including a virtual machine (VM) image for provisioning a VM; and
provision the VM to access the resources provided by one or more available devices of the corresponding subset of the plurality of devices.

7. The NTCRM of claim 6, wherein, to provision the VM, the DMS, in response to execution of the instructions, is to:
operate the VM to generate a device map, the device map indicating physical locations of the plurality of devices to logical addresses of resources provided by the devices; and
operate the VM to determine a service coupling between a requesting entity and resources indicated by the query.

8. The NTCRM of claim 7, wherein the DMS, in response to execution of the instructions, is to:
remove the service coupling between a user of the resource; and
delete the VM.

9. The NTCRM of claim 8, wherein the DMS, in response to execution of the instructions, is to:
detect a state change of a device of the plurality of devices;
generate a report to indicate the state change, wherein the state change is to indicate that the device has changed a mode of operation; and
control transmission of a third REST message including the report.

10. The NTCRM of claim 9, wherein the DMS, in response to execution of the instructions, is to:
attempt, in response to detection of the state change, recovery of the device by power cycling or adjusting the mode of operation.

11. A method to be performed by a device controller (DC) among a plurality of DCs in a consolidated device infrastructure (CDI) system, the plurality of DCs communicatively coupled with a plurality of data management servers (DMSs), and each DC of the plurality of DCs is communicatively coupled with a corresponding subset of devices of a plurality of devices, the method comprising:
receiving, by the DC, a first message including one or more commands from at least one DMS of the plurality of DMSs that are communicatively coupled with the DC, wherein:
the plurality of DMSs are remotely and separately deployed at a plurality of geographic locations of an enterprise, each of the plurality of DMSs is arranged to provide a data tier of services and a hardware tier of services, the data tier of services and the hardware tier of services includes providing access to a pool of resources provided by the plurality of devices,
the plurality of DMSs being communicatively coupled with one or more servers operating as a business logic layer (BLL), and the BLL is arranged to provide a logic tier of services, the logic tier of services includes identifying available resources of the pool of resources and scheduling the identified available resources for use by one or more users, the one or more commands being based on metadata of a resource request to reserve a subset of the identified available resources, and the BLL is communicatively coupled with one or more servers operating a CDI portal, and the CDI portal is arranged to provide a presentation tier of services, the presentation tier of services includes facilitating access to a pool of resources provided by a plurality of devices deployed at different geographic locations of the plurality of geographic locations via submission of the resource request through the CDI portal from any location of the enterprise;

extracting, by the DC, parameters of the one or more commands from the first message, wherein the parameters are in a first format;

converting, by the DC, the parameters into a second format, the second format including general-purpose input/output operations for utilizing resources provided by the corresponding subset of devices that are communicatively coupled with the DC; and transmitting, by the DC to the corresponding subset of devices, a second message including the parameters.

12. The method of claim 11, wherein the resource reservation is a representational state transfer (REST) message.

13. The method of claim 11, wherein:
the parameters comprise instructions for performing the general purpose input/output operations according to the instructions indicated by the parameters;
the first message is a REST message, a Rich Site Summary services message, a Message Queue Telemetry Transport message, or a publish-subscription type message,
the first format comprises a high-level programming language or schema, and
the second format comprises an I2C protocol format.

14. The method of claim 11, further comprising:
obtaining, by the DC from the corresponding subset of devices, a third message including other parameters in a third format;
converting, by the DC, the other parameters into a fourth format for consumption by higher layers; and
transmitting, by the DC to one or more DMS of the plurality of DMSs that are communicatively coupled with the DC, a fourth message including the other parameters in the fourth format.

15. The method of claim 14, further comprising:
the third message comprises an I2C protocol message,
the third format comprises a low-level programming language,
the parameters comprise hardware state information indicating a state change of at least one of the corresponding subset of devices that provide resources,
the fourth format comprises a high-level programming language or schema, and
the fourth message comprises a REST message, a Rich Site Summary services message, a Message Queue Telemetry Transport message, or a publish-subscription type message.

16. A consolidated device infrastructure (CDI) system comprising:
a server to host a CDI portal and arranged to provide a presentation tier of services, the presentation tier of services includes facilitating access to a pool of resources provided by a plurality of devices deployed at a plurality of geographic locations of an enterprise via submission of resource requests through the CDI portal from any location of the enterprise;

a server to host a business logic layer (BLL) to provide a logic tier of services, the logic tier of services includes identifying available resources of the pool of resources and scheduling the identified available resources for use by one or more users; and a plurality of data management servers (DMSs) remotely and separately deployed at the plurality of geographic locations, wherein each of the plurality of DMSs is arranged to provide a data tier of services and a hardware tier of services, the data tier of services and the hardware tier of services includes providing access to the pool of resources provided by the plurality of devices; and a plurality of device controllers (DCs) communicatively coupled with the plurality of DMSs, wherein each DC of the plurality of DCs is communicatively coupled with a corresponding subset of the plurality of devices, and each DC is arranged to convert commands obtained from the plurality of DMSs into general-purpose input/output operations for utilizing resources provided by the corresponding subset of the plurality of devices.

17. The CDI system of claim 16, wherein individual DMSs of the plurality of DMSs are arranged to:
receive, from the server hosting the BLL, a query for available resources;
identify available resources via communication with the plurality of DCs;
transmit, to the server hosting the BLL, an indication of the determined resources;
receive, from the server hosting the BLL, selections of the indicated resources and associated metadata; and
provision one or more virtual machines (VMs) using the metadata, wherein the one or more VMs includes a mapping of physical locations of devices that provide the selected resources to logical addresses of selected resources.

18. The CDI system of claim 17, wherein individual DMSs of the plurality of DMSs are arranged to:
transmit, to the server hosting the BLL, the logical addresses based on the mapping, the logical addresses to be displayed by the presentation tier of services; and
perform network address translation on logical addresses indicated by a resource request to obtain corresponding physical locations of the devices that provide the resources.

19. The CDI system of claim 16, further comprising:
an enterprise network and a plurality of local area networks arranged to couple the server to host the BLL with the plurality of DMSs.

20. A consolidated device infrastructure (CDI) system comprising:
a presentation subsystem arranged to provide a presentation tier of services, the presentation tier of services includes facilitating access to a pool of resources provided by a plurality of devices deployed at a plurality of geographic locations via submission of resource requests through a CDI portal;
a business logic subsystem arranged to provide a logic tier of services, the logic tier of services includes identifying available resources of the pool of resources and scheduling the identified available resources for use by one or more users;
a data management subsystem remotely and separately deployed at the plurality of geographic locations, and the data management subsystem arranged to provide a data tier of services and a hardware tier of services, the data tier of services and the hardware tier of services include providing access to the pool of resources provided by the plurality of devices; and a device control subsystem arranged to convert commands obtained from the data management subsystem into general-purpose input/output operations for utilizing resources provided by a plurality of devices that are communicatively coupled with the device control subsystem.

21. The CDI system of claim 20, wherein the data management subsystem is arranged to:

receive, from the business logic subsystem, a query for available resources provided by the plurality of devices that are communicatively coupled with the device control subsystem;

determine available resources based on the query;

transmit, to the business logic subsystem, an indication of the available resources;

receive, from the business logic subsystem, selections of the indicated resources and associated metadata; and provision a container within the device management subsystem using the metadata for accessing the selected resources.

22. The CDI system of claim 21, wherein the data management subsystem is arranged to:

transmit, to the business logic subsystem, logical addresses of the available resources based on a device map, wherein the presentation subsystem is arranged to display the logical addresses in the presentation tier of services; and perform network address translation on logical addresses indicated by a resource request to obtain corresponding physical locations of the resources.

23. The CDI system of claim 21, wherein the data management subsystem is arranged to:

unprovision the container after a time period for accessing the selected resources has elapsed.

* * * * *